United States Patent
Thirumalai et al.

(10) Patent No.: US 10,855,989 B2
(45) Date of Patent: Dec. 1, 2020

(54) SUBSTREAM MULTIPLEXING FOR DISPLAY STREAM COMPRESSION

(71) Applicant: QUALCOMM Incorporated, San Diego, CA (US)

(72) Inventors: Vijayaraghavan Thirumalai, San Diego, CA (US); Natan Haim Jacobson, San Diego, CA (US); Rajan Laxman Joshi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 190 days.

(21) Appl. No.: 15/617,844

(22) Filed: Jun. 8, 2017

(65) Prior Publication Data
US 2017/0359583 A1 Dec. 14, 2017

Related U.S. Application Data

(60) Provisional application No. 62/347,964, filed on Jun. 9, 2016, provisional application No. 62/359,586, filed on
(Continued)

(51) Int. Cl.
*H04N 19/00* (2014.01)
*H04N 19/157* (2014.01)
(Continued)

(52) U.S. Cl.
CPC ......... *H04N 19/157* (2014.11); *H04L 65/607* (2013.01); *H04L 65/80* (2013.01);
(Continued)

(58) Field of Classification Search
CPC ...... H04N 19/19; H04N 19/176; H04N 19/18; H04N 19/184; H04N 19/423; H04N 9/152;
(Continued)

(56) References Cited

U.S. PATENT DOCUMENTS 5,784,494 A * 7/1998 Strongin ............... H04N 19/91
375/240.23
7,475,257 B2 * 1/2009 Aguilar, Jr. ........... G06F 21/602
713/189
(Continued)

OTHER PUBLICATIONS

International Search Report and Written Opinion of International Application No. PCT/US2017/036772, dated Sep. 14, 2017, 16 pp.
(Continued)

*Primary Examiner* — Frank F Huang
(74) *Attorney, Agent, or Firm* — Shumaker & Sieffert, P.A.

(57) ABSTRACT

An apparatus configured to encode video data comprising a memory configured to store a block of video data and one or more processors in communication with the memory. The one or more processors are configured to determine a coding mode for encoding the block of video data from among one or more coding modes, wherein the coding mode is determined based on a maximum syntax element size, encode the block of video data in a plurality of substreams according to the determined coding mode to create a plurality of encoded substreams of video data, store the plurality of encoded substreams of video data in respective balance first-in, first-out (FIFO) buffers, and multiplex the plurality of encoded substreams in a bitstream for transmitting to a video decoder.

32 Claims, 24 Drawing Sheets

Related U.S. Application Data on Jul. 7, 2016, provisional application No. 62/416,016, filed on Nov. 1, 2016.

(51) Int. Cl.

| | | |
|---|---|---|
| *H04N 19/11* | (2014.01) | |
| *H04N 19/593* | (2014.01) | |
| *H04N 19/423* | (2014.01) | |
| *H04N 19/184* | (2014.01) | |
| *H04N 19/127* | (2014.01) | |
| *H04N 19/146* | (2014.01) | |
| *H04N 19/159* | (2014.01) | |
| *H04N 19/176* | (2014.01) | |
| *H04N 19/169* | (2014.01) | |
| *H04L 29/06* | (2006.01) | |
| *H04N 19/147* | (2014.01) | |

(52) U.S. Cl.
CPC .......... *H04N 19/11* (2014.11); *H04N 19/127* (2014.11); *H04N 19/146* (2014.11); *H04N 19/159* (2014.11); *H04N 19/176* (2014.11); *H04N 19/184* (2014.11); *H04N 19/188* (2014.11); *H04N 19/423* (2014.11); *H04N 19/593* (2014.11); *H04N 19/147* (2014.11)

(58) Field of Classification Search
CPC ........ H04N 19/11; H04N 19/147; H04N 7/32; H04N 7/26; H04N 19/105; H04N 19/102; H04N 19/61; H04N 19/12; H04N 19/146; H04N 19/90

See application file for complete search history.

(56) References Cited

U.S. PATENT DOCUMENTS

| | | | | |
|---|---|---|---|---|
| 8,074,087 | B2* | 12/2011 | Laughlin | G06F 1/3203 713/300 |
| 8,255,919 | B2* | 8/2012 | Beverly | G06F 9/547 712/1 |
| 2003/0208537 | A1* | 11/2003 | Lane | G06Q 10/10 709/204 |
| 2005/0114639 | A1* | 5/2005 | Zimmer | G06F 9/4401 712/244 |
| 2005/0125582 | A1* | 6/2005 | Tu | G06F 13/24 710/260 |
| 2006/0031569 | A1* | 2/2006 | Desic | G06F 9/5083 709/238 |
| 2007/0208956 | A1* | 9/2007 | Lin | G06F 1/26 713/300 |
| 2008/0056347 | A1* | 3/2008 | Chiu | H04N 19/197 375/240 |
| 2009/0316788 | A1* | 12/2009 | Techernatinsky | H04N 19/105 375/240.16 |
| 2015/0296210 | A1* | 10/2015 | Thirumalai | H04N 19/19 375/240.18 |

OTHER PUBLICATIONS

"VESA Display Stream Compression (DSC) Standard v1.2", VESA Display Stream Compression (DSC) Standard, Video Electronics Standards Association, Jan. 20, 2016, 146 pp.

Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.223, Series H: Audiovisual and Multimedia Systems, Infrastructure of audiovisual services—Transmission multiplexing and synchronization, The International Telecommunication Union, Jul. 2001, 74 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.263, Series H: Audiovisual and Multimedia Systems, Infrastructure of audiovisual services—Coding of moving video, Video coding for low bit rate communication, The International Telecommunication Union, Jan. 2005, 226 pp.

ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.

ITU-T H.261, Line Transmission of Non-Telephone Signals, Video Codec for Audiovisual Services At p x 64 kbits, The International Telecommunication Union, Mar. 1993, 29 pp.

"VESA DSC Standard v1.0", Version 1.2 Errata List, Video Electronics Standards Association, Jan. 18, 2017, 12 pp.

"VESA Display Stream Compression (DSC) Standard v1.1", VESA Display Stream Compression (DSC) Standard, Video Electronics Standards Association, Aug. 1, 2014, 125 pp.

Response to Written Opinion dated Sep. 14, 2017, from International Application No. PCT/US2017/036772, filed on Mar. 27, 2018, 29 pp.

Second Written Opinion from International Application No. PCT/US2017/036772, dated Apr. 26, 2018, 10 pp.

International Preliminary Report on Patentability from International Application No. PCT/US2017/036772, dated Jul. 20, 2018, 11 pp.

\* cited by examiner

SUBSTREAM MULTIPLEXING FOR DISPLAY STREAM COMPRESSION

This application claims the benefit of U.S. Provisional Application No. 62/347,964, filed Jun. 9, 2016, U.S. Provisional Application No. 62/359,586, filed Jul. 7, 2016, and U.S. Provisional Application No. 62/416,016, filed Nov. 1, 2016, the entire content of each of which is incorporated by reference herein.

TECHNICAL FIELD

This disclosure relates to the field of video coding and compression, and particularly, to video compression for transmission over display links, such as display stream compression.

BACKGROUND

Digital content capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Links, such as display links, may be used to transfer content from a source (e.g., a memory storing image and/or video data) to a display. For example, a display link may connect a set-top box to a television or a computer to a display.

The bandwidth requirements of display links are typically proportional to the resolution of the displays, and thus, high-resolution displays benefit from large bandwidth display links. Some display links do not have the bandwidth to support high resolution displays. Video compression can be used to reduce the bandwidth requirements such that lower bandwidth display links can be used to provide digital video to high resolution displays. Others have tried to utilize image compression on the pixel data. However, such schemes are sometimes not visually lossless or can be difficult and expensive to implement in conventional display devices.

The Video Electronics Standards Association (VESA) has developed Display Stream Compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In general, this disclosure describes techniques for perform substream multiplexing in a video encoder and video decoder configured to perform display stream compression. The techniques of this disclosure may allow for the use of smaller buffers in the video encoder, thus lowering the cost of encoder implementation and potentially saving power.

In one example of the disclosure, a method for encoding video data comprises determining a coding mode for encoding a block of video data from among one or more coding modes, wherein the coding mode is determined based on a maximum syntax element size, encoding the block of video data in a plurality of substreams according to the determined coding mode to create a plurality of encoded substreams of video data, storing the plurality of encoded substreams of video data in respective balance first-in, first-out (FIFO) buffers, and multiplexing the plurality of encoded substreams in a bitstream for transmitting to a video decoder.

In another example of the disclosure, an apparatus configured to encode video data comprises a memory configured to store a block of video data and one or more processors in communication with the memory, the one or more processors configured to determine a coding mode for encoding the block of video data from among one or more coding modes, wherein the coding mode is determined based on a maximum syntax element size, encode the block of video data in a plurality of substreams according to the determined coding mode to create a plurality of encoded substreams of video data, store the plurality of encoded substreams of video data in respective balance first-in, first-out (FIFO) buffers, and multiplex the plurality of encoded substreams in a bitstream for transmitting to a video decoder.

In another example of the disclosure, an apparatus configured to encode video data comprises means for determining a coding mode for encoding a block of video data from among one or more coding modes, wherein the coding mode is determined based on a maximum syntax element size, means for encoding the block of video data in a plurality of substreams according to the determined coding mode to create a plurality of encoded substreams of video data, means for storing the plurality of encoded substreams of video data in respective balance first-in, first-out (FIFO) buffers, and means for multiplexing the plurality of encoded substreams in a bitstream for transmitting to a video decoder.

In another example, this disclosure describes a computer-readable storage medium storing instructions that, when executed, cause one or more processors configured to encode video data to determine a coding mode for encoding the block of video data from among one or more coding modes, wherein the coding mode is determined based on a maximum syntax element size, encode the block of video data in a plurality of substreams according to the determined coding mode to create a plurality of encoded substreams of video data, store the plurality of encoded substreams of video data in respective balance first-in, first-out (FIFO) buffers, and multiplex the plurality of encoded substreams in a bitstream for transmitting to a video decoder.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
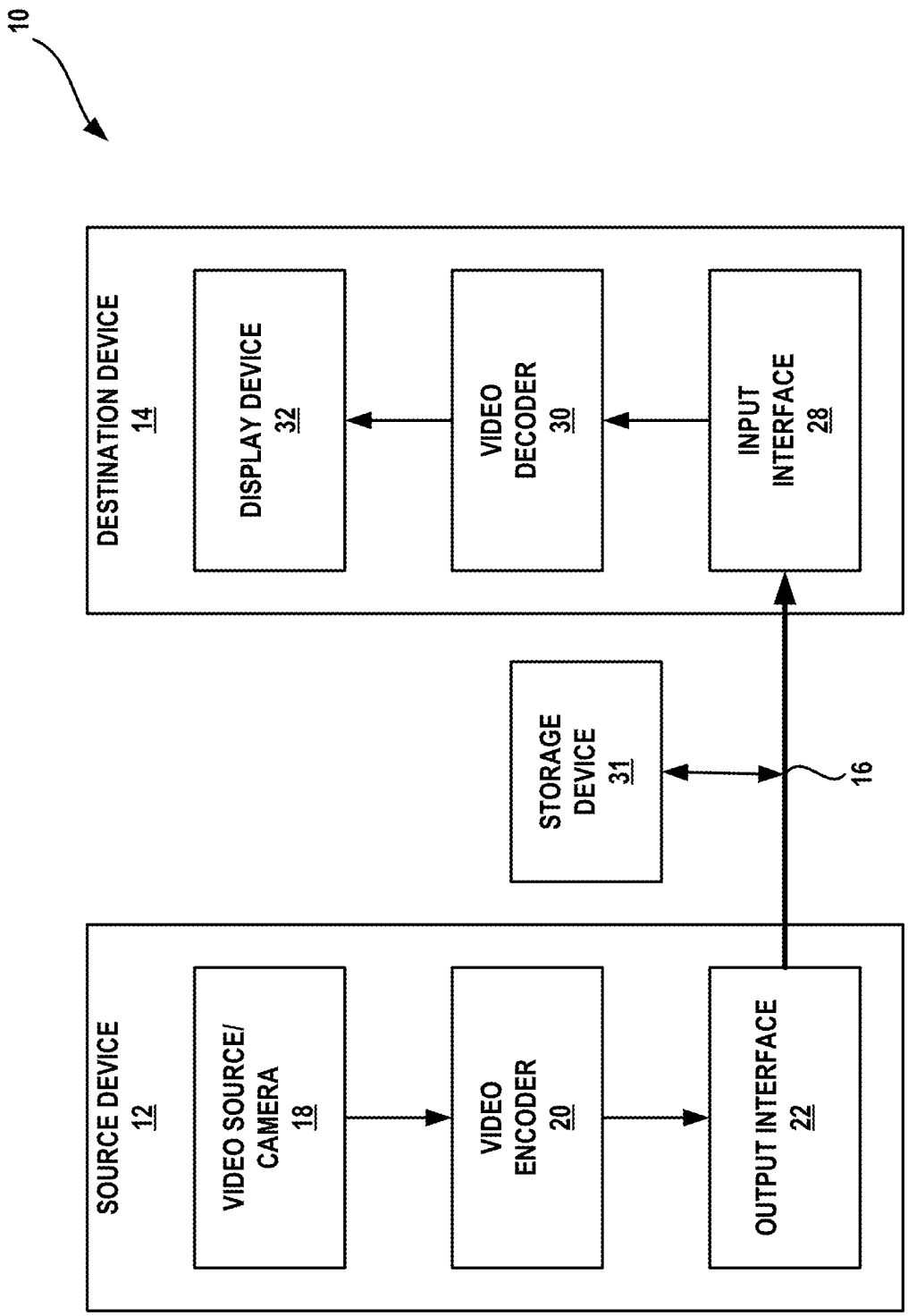
FIG. 1A is a block diagram illustrating an example video coding system that may be configured to perform the techniques of this disclosure.

A digital image, such as a video image, a TV image, a still image or an image generated by a video recorder or a computer, may include pixels or samples arranged in horizontal and vertical lines. The number of pixels in a single image is typically in the hundreds of thousands to millions for 4 k resolution. Each pixel may be represented by luminance and chrominance information (e.g., YCrCb) and/or other color formats (e.g., RGB). Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and ITU-T H.265 (also known as HEVC), including extensions of such standards.

In addition, a video coding standard, namely display stream compression (DSC), has been developed by Video Electronics Standards Association (VESA). The DSC standard is a video compression standard which can compress video for transmission over display links. As the resolution of displays increases, the bandwidth of the video data required to drive the displays increases correspondingly. Some display links may not have sufficient bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

In general, the present disclosure relates to techniques of improving video compression techniques, such as, for example, DSC. More specifically, this disclosure relates to systems and methods for substream multiplexing that facilitates higher throughput by allowing decoders to decode two or more substreams in parallel.

While certain examples are described herein in the context of the DSC standard, one having ordinary skill in the art would appreciate that systems, devices, and methods disclosed herein may be applicable to any suitable video coding standard. For example, example techniques disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), ITU-T H.265, High Efficiency Video Coding (HEVC), and any extensions to such standards. The techniques described herein may be particularly applicable to standards which incorporate a constant bit rate (CBR) buffer model. Also, the techniques described in this disclosure may become part of standards developed in the future. In other words, the techniques described in this disclosure may be applicable to previously developed video coding standards, video coding standards currently under development, and forthcoming video coding standards.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
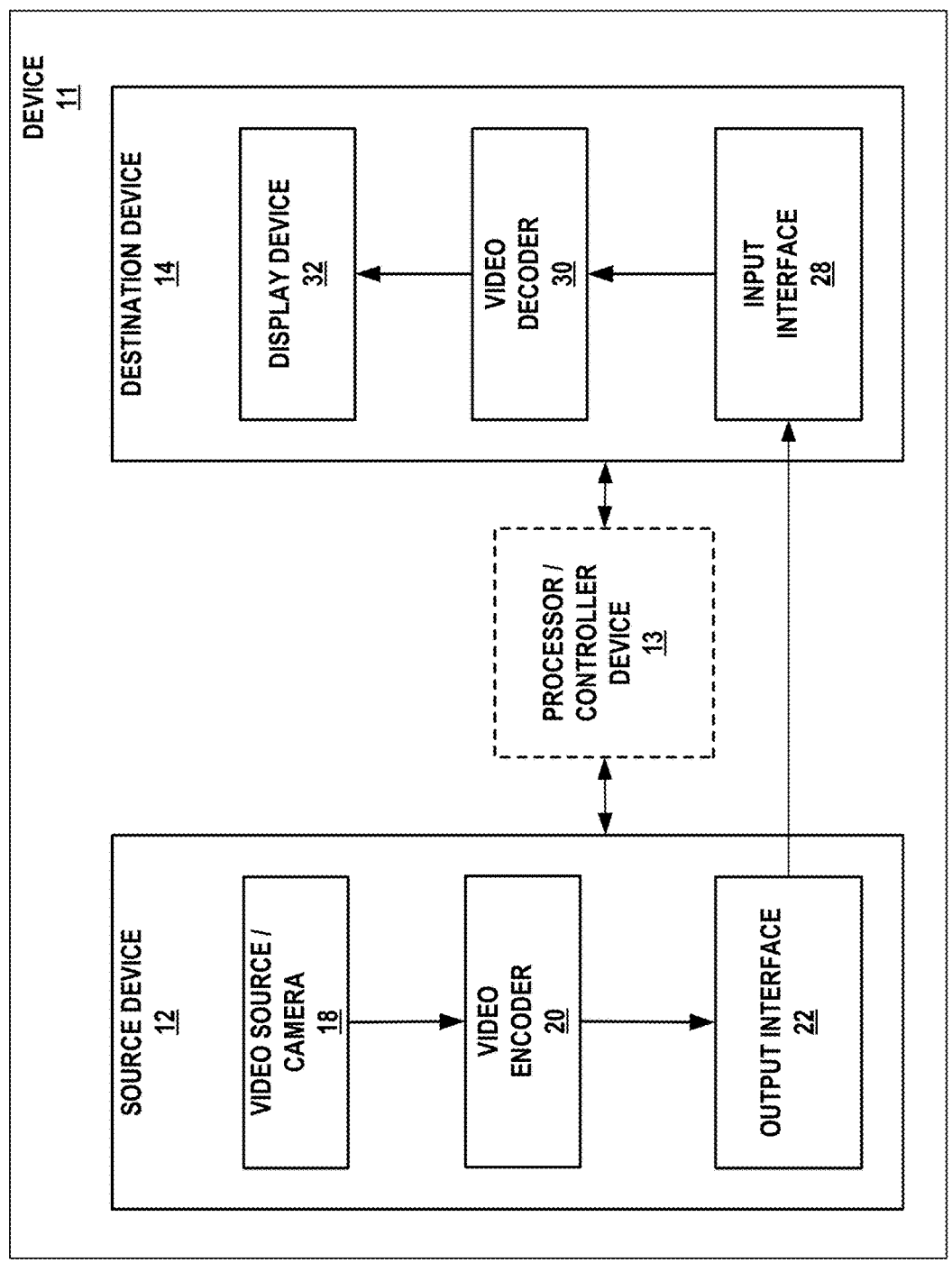
FIG. 1B is a block diagram illustrating another example video coding system that may be configured to perform the techniques of this disclosure.

As shown in FIG. 1A, video coding system 10 includes source device 12 that generates encoded video data to be decoded at a later time by destination device 14. In the example of FIG. 1A, source device 12 and destination device 14 constitute separate devices. It is noted, however, that source device 12 and destination device 14 may be on or part of the same device, as shown in the example of FIG. 1B.

Source device 12 and destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removably attachable) by (to) an entity (e.g., a human, an animal, and/or another controlled device) such as eyewear and/or a wearable computer, devices or apparatus that can be consumed, ingested, or placed within an entity, and/or the like. In various embodiments, source device 12 and destination device 14 may be equipped for wireless communication.

Destination device 14 may receive, via link 16, the encoded video data to be decoded. Link 16 may comprise any type of medium or device capable of moving the encoded video data from source device 12 to destination device 14. In the example of FIG. 1A, link 16 may comprise a communication medium to enable the source device 12 to transmit encoded video data to the destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, source device 12 includes video source 18 (e.g., a camera), video encoder 20 and output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called "camera phones" or "video phones," as illustrated in the example of FIG. 1B. However, the techniques described in this disclosure may be applicable to video coding in general, and may be applied to wireless and/or wired applications.

The captured, pre-captured, or computer-generated video may be encoded by video encoder 20 in accordance with the techniques of this disclosure that will be described in more detail below. The encoded video data may be transmitted to destination device 14 via output interface 22 of source device 12. The encoded video data may also (or alternatively) be stored onto a storage device 31 for later access by the destination device 14 or other devices, for decoding and/or playback. In FIG. 1A, storage device 31 is depicted as being separate from source device 12. In other examples, storage device 31 may be part of source device 12. Video encoder 20 illustrated in FIGS. 1A and 1B may comprise video encoder 20 illustrated FIG. 2A or any other video encoder described herein.

In the example of FIG. 1A, destination device 14 includes input interface 28, video decoder 30, and display device 32. In some cases, input interface 28 may include a receiver and/or a modem. Input interface 28 of destination device 14 may receive the encoded video data over link 16 and/or from storage device 31. The encoded video data communicated over link 16, or provided on storage device 31, may include a variety of syntax elements generated by video encoder 20 for use by a video decoder, such as the video decoder 30, in decoding the video data. Such syntax elements may be included with the encoded video data transmitted on a communication medium, stored on a storage medium, or stored a file server. Video decoder 30 illustrated in FIGS. 1A and 1B may comprise video decoder 30 illustrated in FIG. 2B or any other video decoder described herein.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein source device 12 and destination device 14 are on or part of device 11. Device 11 may be a telephone handset, such as a "smart" phone or the like. Device 11 may include a processor/controller device 13 (optionally present) in operative communication with source device 12 and destination device 14. Video coding system 10' of FIG. 1B, and components thereof, are otherwise similar to the video coding system 10 of FIG. 1A, and components thereof.

Video encoder 20 and video decoder 30 may operate according to a video compression standard, such as, for example, DSC. Alternatively, video encoder 20 and video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard, and may be applied to any video compression techniques that use a constant bit rate buffer model. Other examples of video compression standards include MPEG-2 and ITU-T H.263.

Although not shown in the examples of FIGS. 1A-1B, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder and/or decoder circuitry, including programmable and/or fixed function processing circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 the video decoder 30 may be included in one or more encoders or decoders, either of which may be integrated as part of a combined encoder/decoder in a respective device.

Examples of the current generation of 3:1 DSC v1.0 solution recently finalized by VESA are generally insufficient to drive future market requirements (e.g., mobile market requirements), especially for high resolution displays such as 4K. Therefore, to cope with future demands, VESA released a Cif (call for technology) in order to develop a next generation DSC solution that targets compression ratios of 4:1 and higher.

This disclosure describes a content codec (encoder-decoder) and a test model (which may be named advanced display stream compression (ADSC)). The content coder may be referred to as a DSC coder that provides low cost, fixed rate visually lossless compression. Video encoder 20 and video decoder 30 of FIGS. 1A and 1B are examples of the DSC coder of this disclosure. The test model may refer to compression protocol, algorithm, standard, or the like that content coder may be configured to code data in accordance therewith. In some examples, one or more techniques and/or benefits described herein relate to the ADSC test model. Video encoder 20 and video decoder may be configured to code video data based on a block-based approach (with block size P×Q) and may include a plurality of coding modes. For example, available coding modes for each block may include transform (e.g., discrete cosine transform (DCT), Hadamard), block prediction (BP), differential pulse code modulation (DPCM), pattern, mid-point prediction (MPP), BP skip, and/or mid-point prediction fall back (MPPF) mode. Several coding modes may be used in the coder in order to effectively compress different types of contents or images. For example, text images can be effectively compressed by pattern mode, while natural images may be more effectively captured by transform mode.

In some examples, video encoder 20 may be configured to select a coding mode for each block from the plurality of coding modes based on a rate-control mechanism which aims to select a mode for each block by considering both the rate and the distortion of the mode. The rate-control mechanism is supported by a buffer model. In one example, it may be a design requirement of the codec (e.g., video encoder 20 and video decoder 30) that the buffer is never in a state of underflow (fewer than zero bits in the buffer) or overflow (buffer size has increased past a set maximum size).

When coding a bock, if all the values of a component in a given block are zero, then the component may be effectively coded using skip mode. In skip mode coding, video encoder 20 may signal a 1-bit flag to video decoder 30 to indicate whether the current block is coded using skip mode (e.g., if all values are zero) or not in skip mode (e.g., if at least one value in a block is non-zero). In skip mode, when all of the values of a color component of the current block are zero, video encoder 20 may signal the 1-bit flag to video decoder 30 and video encoder 20 may refrain from coding the values of the color component of the block (i.e., the coding of the values of the color component of the block may be skipped). Skip mode may also be applied to a group of values of a color component having a size that is smaller than a block, or to a group of multiple blocks. Skip mode may also be applied separately for each color component of a block. For example, when all of the values of a color component of the current block are zero, skip mode may be applied to the values of the color component of the current block. In some implementations, skip mode may be applied to all of the color components of a group or block.

As generally described above, video encoder 20 is configured to encode video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data, including one or more syntax element. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include a set of coding parameters such as a quantization parameter (QP). To generate a coded picture, video encoder 20 may partition a picture into equally-sized video blocks. A video block may be a two-dimensional array of samples. Samples may be data that indicates the color of a pixel. In some examples, colors of pixels may be represented by a luma component (e.g., Y) and one or more chroma components (e.g., red and blue chroma (Cr and Cb), or orange and green chroma (Co and Cg)). The coding parameters may define a coding mode for the blocks of the video data. The coding mode may be specified for each block of video data individually or for groups of blocks. The coding mode may be determined in order to achieve a desired rate-distortion performance.

In some examples, video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

Figure 2A:
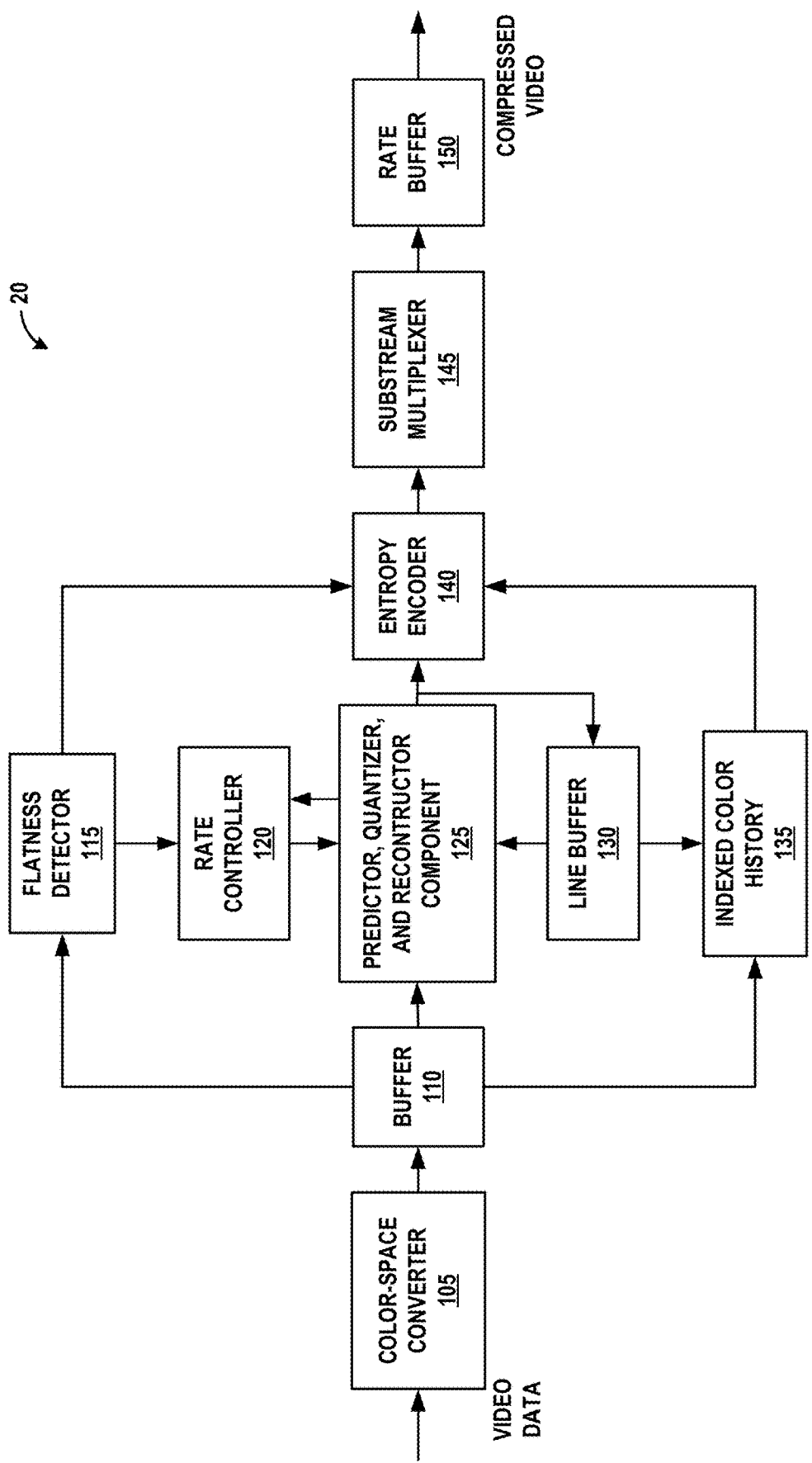
FIG. 2A is block diagram illustrating an example video encoder that may be configured to perform the techniques of this disclosure.

FIG. 2A is a block diagram illustrating an example of the video encoder 20 that may implement techniques in accordance with aspects described in this disclosure. Video encoder 20 may be configured to perform some or all of the techniques of this disclosure. In some examples, the techniques described in this disclosure may be shared among the various components of video encoder 20. In some examples, additionally or alternatively, a processor (not shown) may be configured to perform some or all of the techniques described in this disclosure. For purposes of explanation, this disclosure describes video encoder 20 in the context of DSC coding. However, the techniques of this disclosure may be applicable to other coding standards or methods, including other video coding techniques that use a CBR buffer model.

In the example of FIG. 2A, video encoder 20 includes a plurality of components. The components of video encoder 20 include color-space converter 105, buffer 110, flatness detector 115, rate controller 120, predictor, quantizer, and reconstructor component 125, line buffer 130, indexed color history 135, entropy encoder 140, substream multiplexer 145, and rate buffer 150. In other examples, video encoder 20 may include more, fewer, or different components.

Color-space converter 105 may be configured to receive video data and convert an input color-space of the video data to the color-space used in the coding implementation. For example, in one exemplary embodiment, the color-space of the input video data may be in the red, green, and blue (RGB) color-space, while the coding process performed by video encoder 20 is implemented in the luminance Y, chrominance green Cg, and chrominance orange Co (YCoCg) color-space. The color-space conversion may be performed using any technique, including shifts and additions to the video data. It is noted that input video data in other color-spaces may be processed and conversions to other color-spaces may also be performed.

Buffer 110, line buffer 130, and/or rate buffer 150 may comprise memory or data storage media, such as random-access memory (RAM), synchronous dynamic random-access memory (SDRAM), read-only memory (ROM), non-volatile random-access memory (NVRAM), electrically erasable programmable read-only memory (EEPROM), FLASH memory, cache memory, magnetic or optical data storage media, and the like.

Buffer 110 may be configured to store the color-space converted video data prior to its use by other components of video encoder 20. In another example, the video data may be stored in the RGB color-space and color-space conversion may be performed as needed, since the color-space converted data may require more bits.

Rate buffer 150 may be used as part of the rate control mechanism in video encoder 20, which will be described in greater detail below in connection with rate controller 120. The bits spent on encoding each block can vary highly substantially based on the nature of the particular block. Rate buffer 150 can smooth the rate variations in the compressed video. In some examples, a CBR buffer model is employed in which bits are taken out from the buffer at a constant bit rate. In the CBR buffer model, if video encoder 20 adds too many bits to the bitstream, rate buffer 150 may overflow. On the other hand, video encoder 20 may be configured to add enough bits in order to prevent underflow of rate buffer 150. In some examples, when the rate buffer fullness approaches its maximum size, video encoder may be configured to increase the QP in order to prevent overflow. When the rate buffer fullness approaches empty, zero bits are stuffed into the rate buffer to prevent underflow. Rate buffer 150 may be configured to output the compressed video data to a video decoder (e.g., video decoder 30).

On the video decoder side, bits may be added to rate buffer 155 of video decoder 30 (see FIG. 2B which is described in further detail below) at a constant bit rate, and video decoder 30 may remove variable numbers of bits for each block. To ensure proper decoding, rate buffer 155 of video decoder 30 is preferably configured to not "underflow" or "overflow" during the decoding of the compressed bit stream.

In some examples, the buffer fullness (BF) can be defined based on the values of the syntax element BufferCurrentSize. The value of BufferCurrentSize represents the number of bits currently in the buffer (e.g., rate buffer 150. The value variable BufferMaxSize represents the size of rate buffer 150, i.e., the maximum number of bits that can be stored in rate buffer 150 at any point in time. The BF may be calculated as:

$$BF=((BufferCurrentSize*100)/BufferMaxSize)$$

It is noted that the above approach to calculating BF is merely exemplary, and that the BF may be calculated in any number of different ways, depending on the particular implementation or context.

Flatness detector 115 is configured to detect changes from complex (e.g., non-uniform) areas in the video data to flat (e.g., simple or uniform) areas in the video data, and/or vice versa. The terms "complex" and "flat" will be used herein to generally refer to the difficulty for video encoder 20 to encode the respective regions of the video data. Thus, the term complex as used herein generally describes a region of the video data as being more complex for the video encoder 20 to encode (e.g., requiring more bits and/or more processing time) and may, for example, include textured video data, video data with high spatial frequency, and/or other features which are complex to encode. The term flat as used herein generally describes a region of the video data as being less complex for video encoder 20 to encode (e.g., requiring fewer bit and/or less processing time) and may, for example, include a smooth gradient in the video data, video data with low spatial frequency, and/or other features which are simple to encode. The transitions from complex to flat regions may be used by video encoder 20 to reduce quantization artifacts in the encoded video data. Specifically, rate controller 120 and predictor, quantizer, and reconstructor component 125 can reduce such quantization artifacts when the transitions from complex to flat regions are identified. Similarly, transitions from flat to complex regions may be used by video encoder 20 to increase the QP in order to reduce the expected rate required to code a current block.

Rate controller 120 determines a set of coding parameters, including a QP. Quantization introduces loss in a signal and the amount of loss can be controlled by the value of the QP. Instead of storing the quantization step size for each QP, a scaling matrix may be specified as a function of the QP. In some examples, the quantization step size for each QP can be derived from the scaling matrix. The derived value for the quantization step is not necessarily a power of two, e.g., the derived quantization step size can also be a power of a number different than two. The QP may be adjusted by rate controller 120 based on the buffer fullness of rate buffer 150 and image activity of the video data (e.g., a transition from complex to flat regions or vice versa) in order to maximize picture quality for a target bit rate which ensures that rate buffer 150 does not overflow or underflow. Rate controller 120 may also be configured to determine a particular coding option (e.g., a particular coding mode) for each block of the video data in order to achieve a desired rate-distortion performance. Rate controller 120 minimizes the distortion of the reconstructed images such that it satisfies the bit-rate constraint, i.e., the overall actual coding rate fits within the target bit rate. Thus, one purpose of rate controller 120 is to determine a set of coding parameters, such as QP(s), coding mode(s), etc., to satisfy instantaneous and average constraints on rate while maximizing rate-distortion performance.

Predictor, quantizer, and reconstructor component 125 may perform at least three encoding operations of video encoder 20. Predictor, quantizer, and reconstructor component 125 may perform a prediction coding process (e.g., prediction mode) in a number of different coding modes. One example prediction mode is a modified version of median-adaptive prediction. Median-adaptive prediction may be implemented by the lossless JPEG standard (JPEG-LS). The modified version of median-adaptive prediction which may be performed by predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some examples, video encoder 20 and video decoder 30 may both perform an identical search on reconstructed pixels to determine the block prediction usages, and thus, no bits need to be sent in the block prediction mode. In other examples, video encoder 20 may perform the search and signal block prediction vectors in the bitstream, such that video decoder 30 need not perform a separate search. Predictor, quantizer, and reconstructor component 125 may also be configured to perform a midpoint prediction mode in which samples are predicted using the midpoint of the component range. The midpoint prediction mode may enable bounding of the number of bits required for the compressed video in even the worst-case sample.

In some example prediction modes, predictor, quantizer, and reconstructor component 125 may generate a prediction residual. A prediction residual may be the difference between sample values a predictive block of video data and sample values of the block of video data being coded. As will be discussed below, the prediction residuals may be quantized and may be further compressed, e.g., using entropy encoding techniques.

Predictor, quantizer, and reconstructor component 125 may be further configured to perform quantization. For example, predictor, quantizer, and reconstructor component 125 may perform quantization via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by rate controller 120. Predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by predictor, quantizer, and reconstructor component 125 are merely illustrative and that other approaches may be implemented. It is also noted that predictor, quantizer, and reconstructor component 125 may include subcomponent(s) for performing the prediction, the quantization, and/or the reconstruction. It is further noted that prediction, the quantization, and/or the reconstruction may be performed by several separate encoder components in lieu of predictor, quantizer, and reconstructor component 125.

Line buffer 130 is configured to store the output from predictor, quantizer, and reconstructor component 125 so that predictor, quantizer, and reconstructor component 125 and indexed color history 135 can use and/or store the buffered video data. Indexed color history 135 is a memory configured to store recently used pixel values. These recently used pixel values can be referenced directly by video encoder 20 via a dedicated syntax.

Entropy encoder 140 encodes the prediction residuals and any other data (e.g., syntax elements and indices identified by the predictor, quantizer, and reconstructor component 125) received from predictor, quantizer, and reconstructor component 125 based on indexed color history 135 and the flatness transitions identified by flatness detector 115. In some examples, entropy encoder 140 may encode three samples per clock per substream encoder. Substream multiplexer 145 may multiplex the bitstream based on a headerless packet multiplexing scheme. This allows video decoder 30 to run three entropy decoders in parallel, facilitating the decoding of three pixels per clock. Substream multiplexer 145 may optimize the packet order so that the packets can be efficiently decoded by video decoder 30. It is noted that different approaches to entropy coding may be implemented, which may facilitate the decoding of power-of-2 pixels per clock (e.g., 2 pixels/clock or 4 pixels/clock).

Figure 2B:
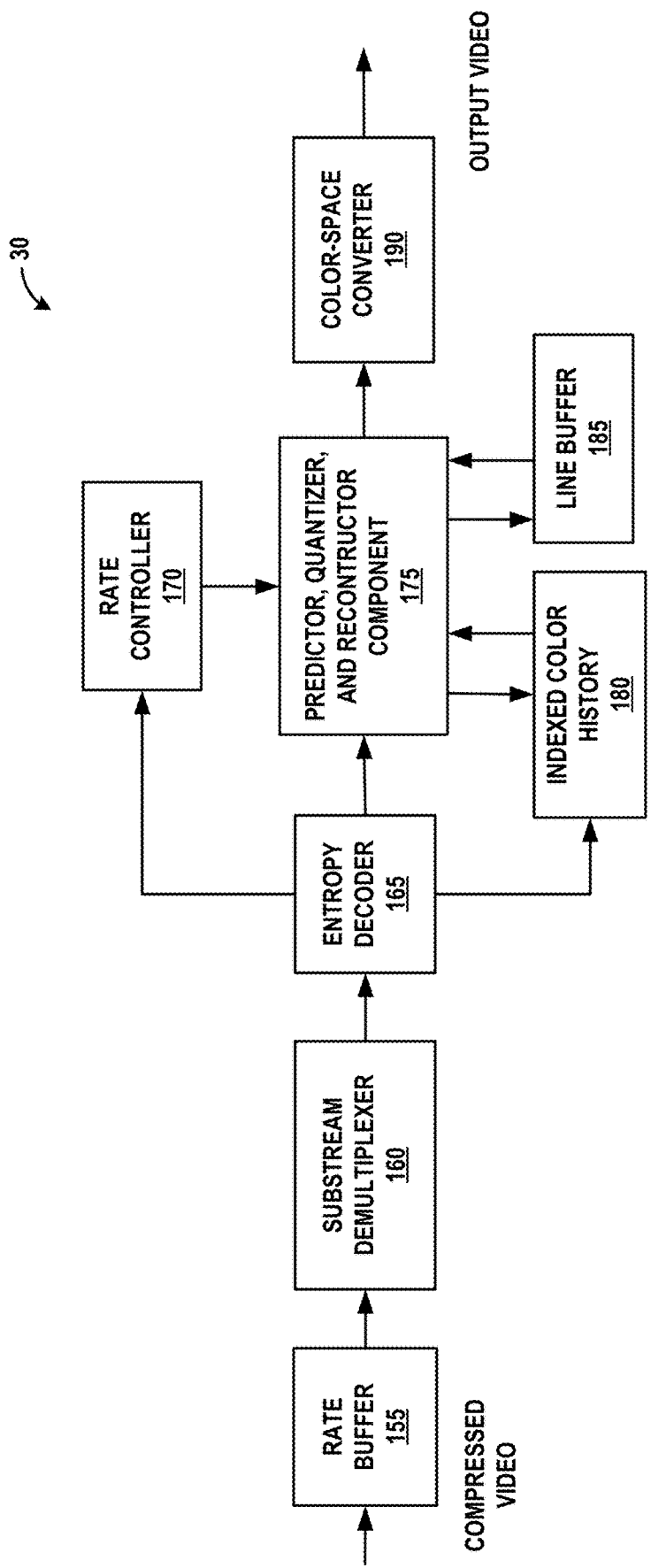
FIG. 2B is block diagram illustrating an example video decoder that may be configured to perform the techniques of this disclosure.

FIG. 2B is a block diagram illustrating an example video decoder 30 that may implement techniques in accordance with aspects described in this disclosure. Video decoder 30 may be configured to perform some or all of the techniques of this disclosure. In some examples, the techniques described in this disclosure may be shared among the various components of the decoder 30. In some examples, additionally or alternatively, a processor (not shown) may be configured to perform some or all of the techniques described in this disclosure.

For purposes of explanation, this disclosure describes video decoder 30 in the context of DSC coding. However, the techniques of this disclosure may be applicable to other coding standards or methods.

In the example of FIG. 2B, the video decoder 30 includes a plurality of functional components. The functional components of video decoder 30 include rate buffer 155, substream demultiplexer 160, entropy decoder 165, rate controller 170, predictor, quantizer, and reconstructor component 175, indexed color history 180, line buffer 185, and color-space converter 190. The illustrated components of video decoder 30 are analogous to the corresponding components described above in connection with video encoder 20 in FIG. 2A. As such, each of the components of video decoder 30 may operate in a similar, but reciprocal fashion to the corresponding components of the video encoder 20 as described above.

Line buffer 185, and/or rate buffer 155 may comprise memory or data storage media, such as RAM, SDRAM, ROM, NVRAM, EEPROM, FLASH memory, cache memory, magnetic or optical data storage media, and the like. Rate buffer 155 may be configured to receive compressed video (e.g., from video encoder 20), and is used as part of the rate control mechanism in video decoder 30. The bits spent on decoding each block can vary highly substantially based on the nature of the particular block. Rate buffer 155 can smooth the rate variations in the compressed video. In some examples, a CBR buffer model is employed in which bits are taken out from rate buffer 155 at a constant bit rate.

As will be discussed in greater detail below, substream demultiplexer 160 may demultiplex the bitstream based on a headerless packet multiplexing scheme. This allows video decoder 30 to run three entropy decoders (e.g., as part of entropy decoder 165) in parallel, facilitating the decoding of three pixels per clock. Entropy decoder 165 decodes, in a reciprocal fashion to that of entropy encoder 140 of FIG. 2A, the compressed prediction residuals and any other data (e.g., syntax elements and indices) received from substream demultiplexer 160.

Rate controller 170 determines a set of coding parameters, including a QP. Quantization introduces loss in a signal and the amount of loss can be controlled by the QP. In some example, rate controller 170 may receive the QP from video encoder 20 in the compressed video bitstream. Rate controller 170 may supply the determined QP to predictor, quantizer, and reconstructor component 175.

Predictor, quantizer, and reconstructor component 175 may perform at least three decoding operations of video decoder 30. Predictor, quantizer, and reconstructor component 175 may be further configured to perform inverse quantization. For example, predictor, quantizer, and reconstructor component 175 may perform inverse quantization in accordance with the QP determined by rate controller 170.

Predictor, quantizer, and reconstructor component 175 may also perform a prediction decoding process (e.g., prediction mode) in a number of different coding modes. Example coding modes were discussed above with reference to predictor, quantizer, and reconstructor component 125 of FIG. 2A, though other coding modes may be used. Predictor, quantizer, and reconstructor component 175 may receive syntax elements in the compressed video bitstream to indicate the coding mode used for a particular block of video data or blocks of video data. Based on the coding mode, predictor, quantizer, and reconstructor component 175 may determine a predictive block for the currently decoded block. Predictor, quantizer, and reconstructor component 125 may also then perform reconstruction which includes adding the inverse quantized residual values to the determined predictive block to produce the decoded block.

It is noted that the above-described example approaches to prediction, quantization, and reconstruction performed by predictor, quantizer, and reconstructor component 175 are merely illustrative and that other approaches may be implemented. It is also noted that predictor, quantizer, and reconstructor component 175 may include subcomponent(s) for performing the prediction, the inverse quantization, and/or the reconstruction. It is further noted that prediction, the inverse quantization, and/or the reconstruction may be performed by several separate encoder components in lieu of predictor, quantizer, and reconstructor component 175.

Line buffer 185 is configured to store the output from predictor, quantizer, and reconstructor component 175 so that predictor, quantizer, and reconstructor component 175 and indexed color history 180 can use and/or store the buffered video data. Indexed color history 180 is a memory configured to store recently used pixel values. These recently used pixel values can be referenced directly by video decoder 30 via a dedicated syntax.

Color-space converter 190 may be configured to convert the color space used in the coding implementation to an output color-space. For example, in one exemplary embodiment, the color-space of the output video data may be in the red, green, and blue (RGB) color-space, while the coding process performed by video decoder 30 is implemented in the luminance Y, chrominance green Cg, and chrominance orange Co (YCoCg) color-space. The color-space conversion may be performed using any technique, including shifts and additions to the video data. It is noted that output video data in other color-spaces may be processed and conversions to other color-spaces may also be performed.

The following sections will discuss additional techniques for DSC in more detail. In one example for DSC, the QP for the current block (denoted as currQP) may be derived or calculated based on the following equation:

$$currQP = prevQ + QpAdj * (diffBits > 0 ? 1 : -1),$$

where prevQP is the QP associated with the previous block of video data, diffBits represents the difference between the previousBlockBits and targetBits, QpAdj is the QP offset value (e.g., QP adjustment value) that is calculated based on the magnitude of diffBits, previousBlockBits represents the number of bits used to code the previous block, and targetBits represents a target number of bits in which to code the current block. When previousBlockBits is greater than targetBits, diffBits is positive, and the current block QP may be derived by adding the offset value QpAdj to the prevQP value. In other words, the QP value does not decrease in value from the prevQP value when diffBits is positive. When previousBlockBits is less than or equal to targetBits, diffBits is negative or zero, and currQP does not increase from the prevQP value. It is noted that the offset value QpAdj may be calculated, for example, as a function of diffBits in such a way that QpAdj monotonically increases as the magnitude of diffBits increases.

Figure 3:
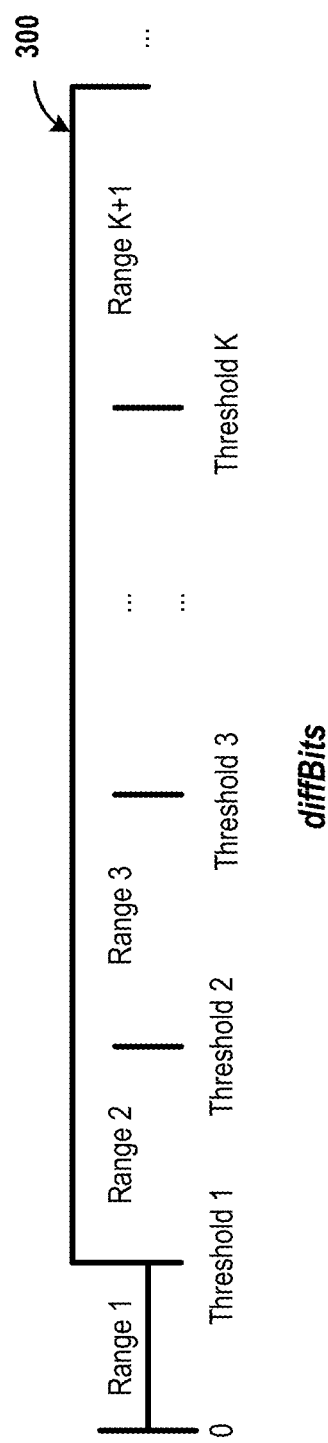
FIG. 3 is a graph illustrating one example techniques for computing a quantization parameter.

One technique, referred to herein as a default technique, for calculating the QP adjustment value QpAdj will now be described with reference to FIG. 3. FIG. 3 illustrates a graph 300 including an axis on which values of diffBits starting at zero are plotted. In the default technique, when diffBits >0, diffBits may be classified into K+1 ranges using K threshold values. These threshold values are illustrated by the labels Threshold 1, Threshold 2, Threshold 3, ..., and Threshold K and the ranges are illustrated by the labels Range 1, Range 2, Range 3, ... and Range K+1. In the default technique of FIG. 3, there is shown one approach to segmenting diffBits into K+1 ranges using K threshold values. Each range may be associated with a specific QpAdj value, where the QpAdj value increases as the range index increases. When diffBits≤0, the absolute value of diffBits may be classified into J+1 ranges using J threshold values (not illustrated), and there may be a specific QpAdj value assigned for each of the J+1 ranges.

In other aspects, the currQP value may be adjusted based on the fullness of the buffer (which may be represented in terms of buffer fullness BF), in order to prevent underflow and/or overflow of the buffer. In particular, when BF exceeds a certain threshold (e.g., $P_1$), currQP may be incremented by a fixed offset value (e.g., $p_1$). For example, currQP may be adjusted as follows: currQP+=$p_1$. Further, when BF falls below a certain threshold (e.g., $Q_1$), currQP may be decremented by $q_1$, e.g., currQP-=$q_1$. In certain aspects, a plurality of thresholds may be employed, and for each threshold there may be a corresponding offset value to adjust currQP.

When a transition from a complex region to a flat region is identified or when a flat region is identified, the currQP may be set to a low value (e.g., a value below a defined currQP value), as described in further detail below.

The bits spent on encoding each block may vary highly substantially based on the nature of the block. Therefore, a buffer may be part of the rate control mechanism in order to smooth the rate variations in the output bit stream.

Referring back to FIGS. 2A and 2B, entropy encoder 140 and entropy decoder 165 may apply various types of entropy coding techniques. In one example, delta size unit-variable length coding (DSU-VLC) may be used. In DSU-VLC, the quantized residual values of K-length sample vector (defined as "group") may be coded using prefix and suffix parts. The samples here refer to the value in a single color component. For example, for RGB 444, each pixel has three samples. The prefix part may indicate the size of the residual value (the size is denoted as B bits) that follows the suffix part, and the suffix part may indicate the actual residual values of all samples in the unit. The K residual values in the group may be coded, for example, in two's complement using the same number of bits.

Figure 4A:
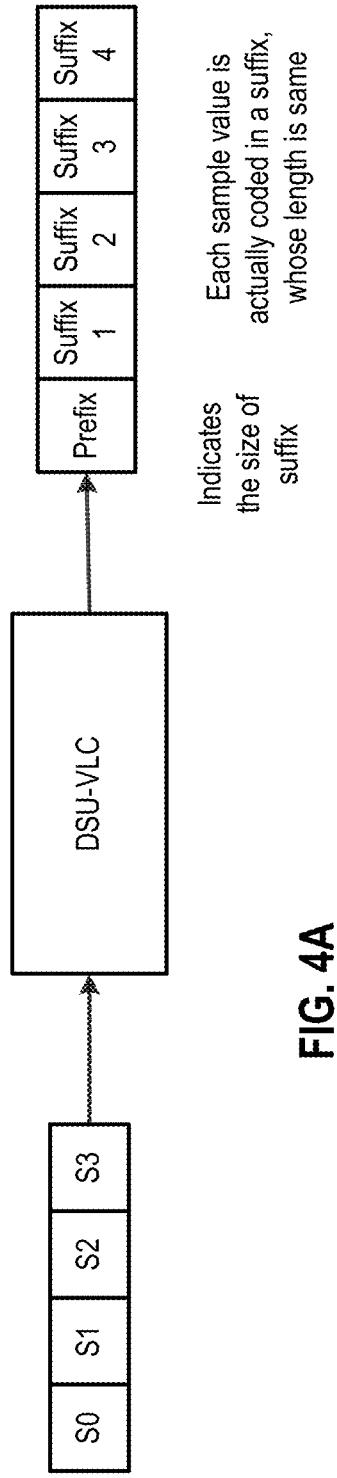
FIG. 4A is a conceptual diagram showing an example entropy coding technique.
Figure 4B:
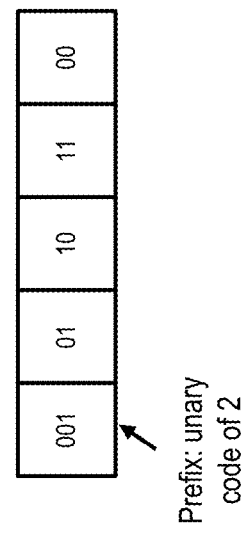
FIG. 4B is a conceptual diagram showing an example codeword.

With reference to FIG. 4A, there is shown an example DSU-VLC structure for a vector with K=4 samples. As an example, the size to code the group of 4 samples [1, −2, −1, 0] may be B=2 bits using two's complement representation. An example of DSU-VLC code is shown in FIG. 4B, where 001 represents the unary code of the prefix, and [01, 10, 11, 00] respectively represent the actual coded sample value using two bits. By decoding the prefix, usually done in a single clock, all of the 4 symbols may be decoded.

In another example, a high throughput entropy coding technique may be implemented (e.g., via the entropy encoder 140 of the video encoder 20 and/or the entropy decoder 165 of the video decoder 30) to provide, for example, a throughput of 4 samples/clock. The high throughput entropy coding technique may involve partitioning the quantized residual of the samples within a given block (e.g., having block size P×Q) into N groups, and then coding the group samples using DSU-VLC. The partitioning of a block of samples into N groups may be uniform or non-uniform.

Figure 5:
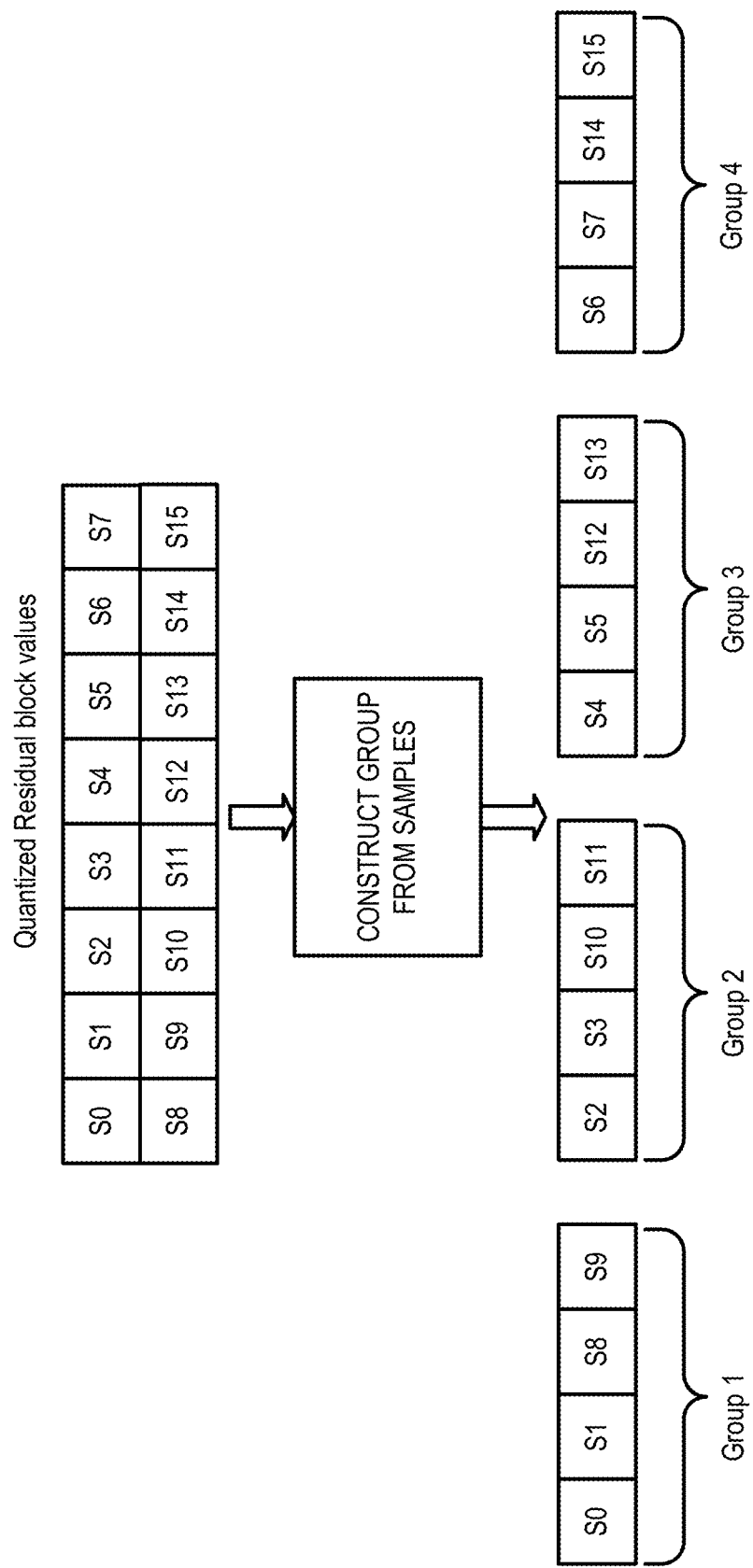
FIG. 5 is a conceptual diagram illustrating quantized residual block groups according to one example of the disclosure.

With uniform grouping, the N groups each have an equal number of samples, and the samples may be used in BP mode, DPCM mode, etc. FIG. 5 illustrates an example approach to uniform grouping, where a 2×8 block of quantized residual block values is partitioned into four groups, with each group having four samples. With non-uniform grouping (not illustrated), the number of samples in each group may be different, and the samples may be used in transform mode.

Techniques for substream multiplexing (SSM) have been proposed for DSC. In general, SSM involves breaking the bitstream of encoded video data into substreams based on common characteristics (e.g., each color component may be a substream). In one example, a headerless SSM technique may be implemented to multiplex multiple substreams into a single stream using, for example, fixed length words (e.g., mux words). That is, video encoder 20 may be configured to transmit packets (e.g., mux words) of a fixed size (e.g., as indicated by the syntax muxWordSize). The mux words may be derived and placed in the single stream in such a way that the decoders can decode multiple substreams in parallel.

In the present example, each color component of the video data may be considered as a substream, e.g., luminance (Y), chrominance orange (Co), and chrominance green (Cg), such that a total of three substreams are present. In related aspects, the mux word size (muxWordSize) may be dependent on the number of bits used per component (bpc), e.g., 48 bits for 8 bpc and for 10 bpc, 64 bits for 12 bpc, etc. In further related aspects, a mux word size may be set to be greater than or equal to the maximum syntax element size (maxSeSize), where maxSeSize refers to the maximum possible size of a single component worth of compressed data for one group. This means that video decoder 30 may be configured to request at most one mux word from each substream in order to decode a single group.

Figure 6A:
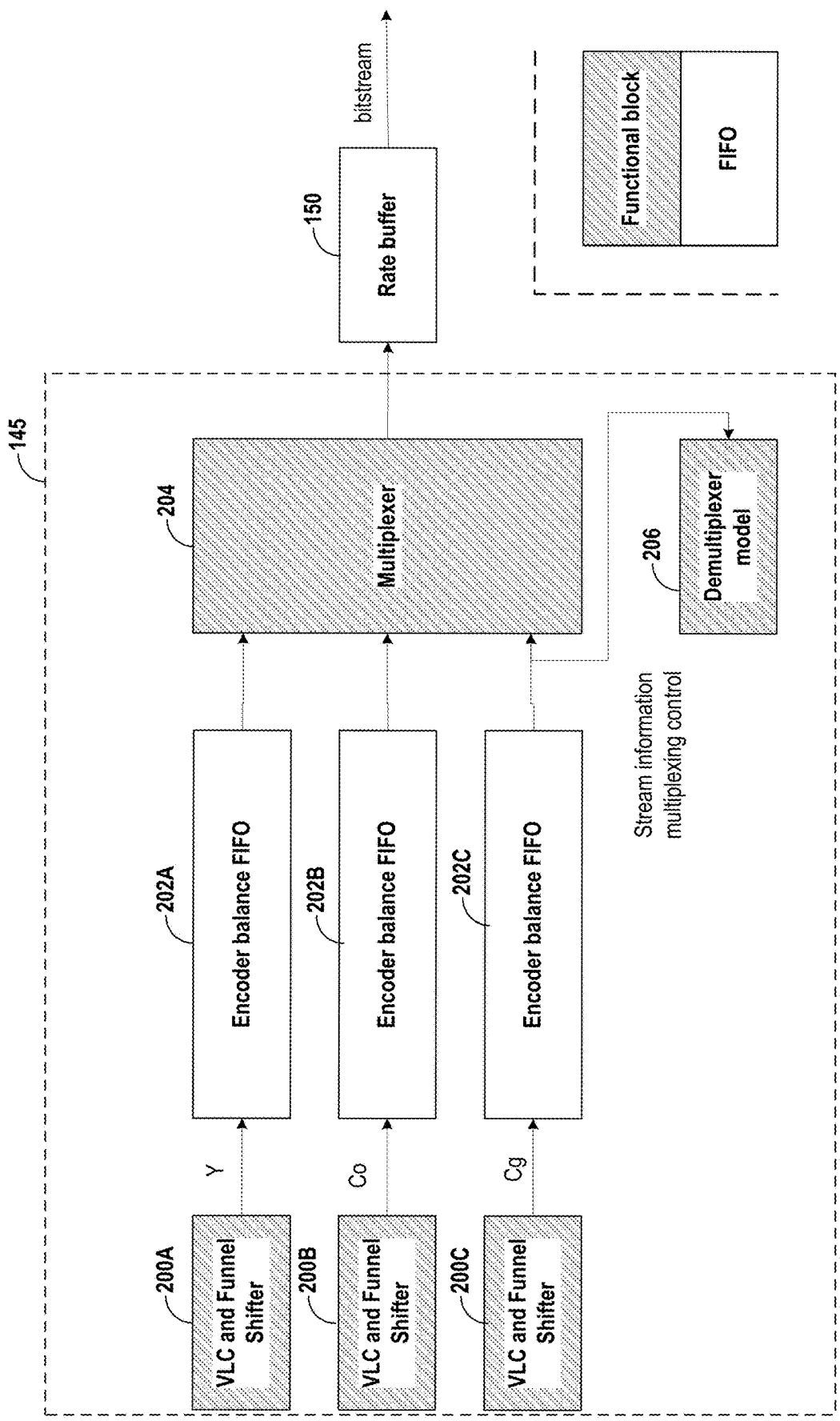
FIG. 6A is a block diagram showing substream multiplexing in a video encoder according to one example of the disclosure.
Figure 6B:
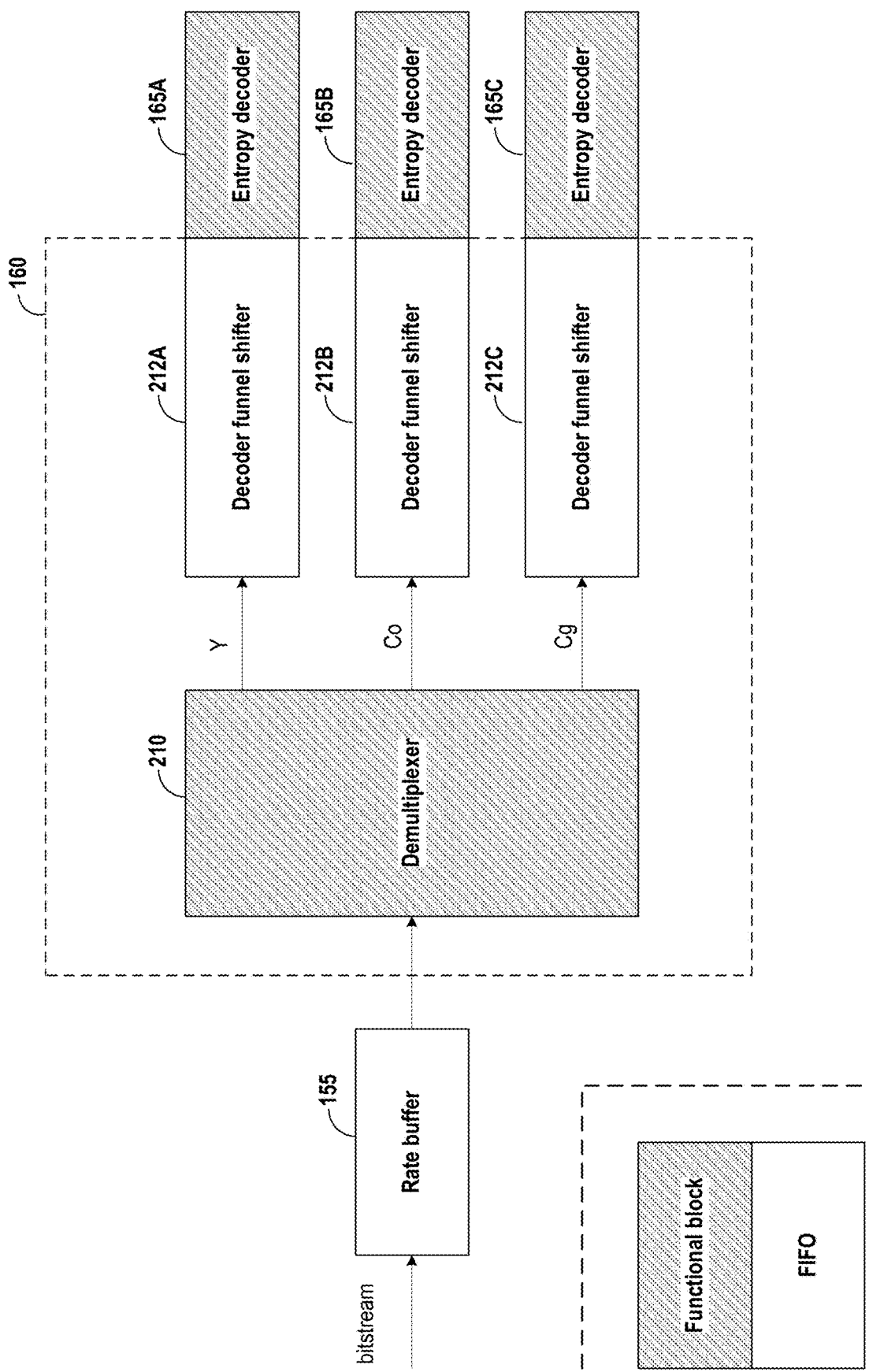
FIG. 6B is a block diagram showing substream demultiplexing in a video decoder according to one example of the disclosure.

FIG. 6A illustrates components for performing one or more example aspects of SSM at an encoder (e.g., substream multiplexer 145 of video encoder 20). In FIG. 6A and FIG. 6B, hashed blocks depict structures that perform the SSM functions, while white blocks depict FIFO buffers. On the encoder side, SSM may involve using a balance first-in, first-out (FIFO) approach for each substream that stores multiple groups (e.g., each group containing 3 pixels) of encoded data. As the mux words are derived to facilitate parallel decoding, a demultiplexer model 206 may be implemented at video encoder 20. FIG. 6B illustrates components for performing one or more example aspects of SSM at a decoder (e.g., substream demultiplexer 160 at video decoder 30). On the decoder side, the demultiplexer model may include three or more funnel shifters (e.g., a funnel shifter for each substream) and entropy decoders 165A, 165B, 165C (one for each substream) that decodes the color components in parallel. Entropy decoders 165A, 165B, 165C may be part of entropy decoder 165 of FIG. 2B. The combination of funnel shifter and entropy decoder may be called a substream processor (SSP). At each group time (or block time), each SSP may request one mux word or none. In DSCv1.x, operations are performed on a group of the samples. As such, the time at which a group of 3 samples is encoded may be called group time. In examples of this disclosure, encoding and decoding may be performed on a larger block of samples (e.g., an 8×2 block of samples). The time at which a block of samples is encoded may be called block time. A mux word may be requested by a SSP when the number of bits in the funnel shifter is strictly smaller than maxSeSize. In FIGS. 6A and 6B, the shaded blocks are functional blocks, while the non-shaded blocks are FIFO buffers.

Returning to FIG. 6A, video encoder 20 may include a VLC and funnel shifter 200A, 200B, and 200C (collectively, "VLC and funnel shifters 200"), respectively, for each color component of the video data being processed (e.g., Y, Co, and Cg). In some examples, the VLC function of VLC and funnel shifters 200 may be executed by entropy encoder 140 of FIG. 2A. VLC and funnel shifters 200 may be configured to apply VLC encoding (e.g., DSU-VLC) to each color component of a block of video data. VLC and funnel shifters 200 may include funnel shifters to move coded video data to encoder balance FIFO 202A, 202B, and 202C (collectively, encoder balance FIFOs 202). In general, a shifter is a digital circuit that can shift a data word by a specified number of bits. A funnel shifter is a shifter that has a larger number of input bits than output bits. That is, not all bits input to the funnel shifter are output at each clock cycle. Encoder balance FIFOs 202 store mux words for later transmission to video decoder 30.

When a mux word request is received from the SSP of video decoder 30, multiplexer 204 may place a single mux word from one of encoder balance FIFOs 202 into rate buffer 150. For example, when a request is made for a Y component mux word from the SSP of video decoder 30, then multiplexer 204 may move a mux word from the Y encoder balance FIFO 202A and place the mux word in rate buffer 150 for sending in the bitstream. For a given group time, multiple requests can be received from the SSPs (at most one for each substream) of video decoder 30. In such scenarios, the requested mux words may be placed into rate buffer 150 in a specific order (e.g., where Y is given the highest priority, followed by Co, and then followed by Cg). Multiplexer 204 may be configured to place mux words into rate buffer 150 in a specific order based on demultiplexer model 206. Demultiplexer model 206 is a model of how the SSM process is carried out by video decoder 30. In this way, video encoder 20 may determine in which order video decoder 30 will request mux words (e.g., the order of mux words from the specific substreams), and multiplexer 204 may then place the mux words in rate buffer 150 based on the determined order supplied by demultiplexer model 206.

The balance FIFO size of encoder balance FIFOs 202A, 202B, 202C may be derived or set to prevent overflow or underflow of bits at rate buffer 150. In general, the balance FIFO size may be dependent on the difference between the maxSeSize and minimum syntax element size (minSeSize), as well as the muxWordSize.

In one example, at the beginning of a slice, encoder balance FIFOs 202 may be filled with (muxWordSize+maxSeSize−1) groups of data. This may correspond to an initial delay period, during which time no mux words are transmitted to video decoder 30 (e.g., called an SSM delay time). In order to prevent overflow, each of encoder balance FIFOs 202 may be configured to store (muxWordSize+maxSeSize−1)*maxSeSize bits. In order to prevent underflow, the FIFO size may be calculated such that each of encoder balance FIFOs 202 contains one mux word worth of data whenever a request is made from video decoder 30 (e.g., as indicated by demultiplexer model 206).

At the beginning or encoding, for muxWordSize+maxSeSize−1 groups, encoder balance FIFOs 202 may be filled with coded bits without removing any mux words. After this initial delay, multiplexer 204 may remove one mux word from each of balance FIFOs 202 and send the mux words to rate buffer 150. In addition, multiplexer 204 may place these mux words in the respective funnel shifters of demultiplexer model 206. For each group time, in demultiplexer model 206, the number of bits in the funnel shifter may be reduced by the size of the syntax element.

In general, the syntax element size may refer to the number of bits required to decode a single substream's worth of data in a single group. In one example, a syntax element may refer to a single component worth of data in a single group, as each component may belong to a separate substream. One purpose of demultiplexer model 206 at video encoder 20 is to mimic the actual decoding at video decoder 30, such that video encoder 20 places mux words into the bitstream in the correct order for video decoder 30. The funnel shifter fullness may be reduced depending on the number of bits required to decode one group at the time. When the funnel shifter fullness falls below the maximum syntax element size (maxSeSize), video decoder 30 (and demultiplexer model 206) may make a request to add a mux word to the funnel shifter. The same mux word may also be sent to rate buffer 150. This process (of decrementing each funnel shifter fullness by the corresponding syntax element size and requesting a mux word when fullness of the funnel shifter is less than the maxSeSize) may proceed until each group in the slice is finished encoding. In some examples, at the end of the slice, an encoder balance FIFO 202 may not contain enough bits to form a single mux word or may be empty. In such cases, zero padding (i.e., padding with zero-valued bits) may be performed to derive the mux word.

Returning to FIG. 6B, rate buffer 155 may receive and store mux words from the bitstream. Demultiplexer 210 may read mux words from rate buffer 155 and place them in one of decoder funnel shifter 212A, 212B, or 212C (collectively, decoder funnel shifters 212), in the order in which the mux words were requested. That is, demultiplexer 210 may direct received mux words to the appropriate decoder funnel shifter 212 based on which substream had requested the mux word. The mux words for each substream may then be entropy decoded by one of entropy decoders 165A, 165B, or 165C (e.g., entropy decoder 165 of FIG. 2B.

In certain examples, instead of using two's complement representation, sign magnitude representation may be used to code each group or block of samples. In sign magnitude representation, the absolute value of a symbol value in each group or block is coded followed by a sign-bit for every non-zero symbol. The prefix part indicates the bits, B, needed to signal the maximum absolute value of the symbols in the group. The suffix part represents the absolute value of each symbol. Finally, the sign bit for non-zero symbols is signaled.

As an example, assume that the group contains 4 samples and the values are [1, −3, −1, 0]. Also, in this example, the prefix is B=2 (which is calculated from the absolute values, [ 1, 3, 1 0]), and the suffixes are 01, 11, 01, 00. Finally, the sign information 100 is signaled, where '1' indicates positive, '0' indicates negative. The sign for zero is not signaled.

When compared to two's complement representation, an advantage of this representation provides that the sign information for symbols whose value is zero is not signaled. Therefore, this representation can result in superior coding performance, when the zero value is more probable in certain modes, e.g., block prediction and transform mode.

When sign magnitude representation is used and assuming that the sign bit for symbol zero is not signaled, it may be desirable for the parser logic in video decoder 30 to reconstruct or decode the symbol to know whether to read the sign information from the bit stream. That is, the parser logic may determine whether each symbol is zero or non-zero. If a symbol is non-zero, then the sign information is parsed from the bit stream, otherwise (when symbol is zero), the sign bit is not read from the bit stream. Because of this dependency between the parser and the decoder (e.g., the logic in video decoder 30 that decodes the symbol) in some examples, the maximum decoder throughput may be reduced.

In order to increase the throughput, a hybrid method may be used in certain examples, wherein an initial few groups or blocks are coded based on sign-magnitude representation and the remaining groups or blocks are coded based on two's complement representation. For example, the first three groups or blocks are coded using sign magnitude representation and the last group or block is coded using two's complement representation. The actual entropy coder for each representation can be based on DSU-VLC or can be vector-EC. For clarity, the vector-EC for two's complement representation may be based on DSU-VLC, where the symbols are mapped to a single code value, and then the code value is coded using VLC codes. In sign-magnitude representation, the absolute value of each symbol is mapped to a single code value and is coded using a VLC codes. In addition to this, sign bit is signaled for each non-zero symbol.

In some previous example DSC implementations, the size of the balance FIFO grows with the difference between the maxSeSize and minSeSize. The balance FIFO size given these parameters is computed as follows. There is a delay of ssmDelay block-times at the beginning of a slice. During this time, bits are placed into the SSM balance FIFO (e.g., encoder balance FIFOs 202), but none are removed. Essentially, this is a buffering period to ensure that enough bits exist in the SSM balance FIFO before transmission begins. To ensure that the SSM balance FIFO does not underflow, the following number of bits (requiredBits) are stored in the balance FIFO before transmission can begin: "requiredBits"=("maxSeSize"+"muxWordSize"−1).

In the worst case, a balance FIFO will fill at a rate of one minSeSize syntax element per block-time. Assuming this worst-case behavior, the SSM delay (measured in block-time) is calculated as: "ssmDelay"=ceil("requiredBits"/"minSeSize").

Given ssmDelay, the parameter balanceFifoSize is determined such that the balance FIFO does not overflow. This would be the case if every block during the SSM delay period has maxSeSize bits. The balance FIFO size is computed as:

"balanceFifoSize"="ssmDelay"*"maxSeSize"

For example, suppose the following configuration:
minSeSize=1
maxSeSize=142
muxWordSize=144
From this, balanceFifoSize is calculated as:

"requiredBits"=("maxSeSize"+"muxWordSize"−1)= (142+144−1)=285

"ssmDelay"=ceil("requiredBits"/"minSeSize")=ceil (285/1)=285

"balanceFifoSize"="ssmDelay"*"maxSeSize"=285*142=40470 (approx. 40 kbit)

As another example, when maxSeSize=185, minSeSize=1, and muxWordSize=192, the size of each balance FIFO may be (185+192−1)*192=72192 bits. Since multiple substreams may be used in accordance with the DSC SSM techniques of this disclosure, the hardware cost associated with the present examples may be prohibitive.

In addition, the number of substreams and the arrangement of compressed data of a single block into several substreams may not be optimized for larger block sizes (e.g., 8×2 block sizes or larger). In particular, the substream multiplexing scheme of some of the previous examples may be better suited to only groups of three samples.

In accordance with one or more examples of the present disclosure, this disclosure describes various SSM techniques for video compression technology (e.g., display stream compression) that uses larger block sizes. The techniques disclosed here are not limited to display stream compression; rather, the disclosed techniques may be applied to any coding scheme where parallel decoding is desired to increase the throughput. It should be understood that the techniques described below may be used independently or together. In particular, this disclosure describes various techniques for zero padding, zero padding detection, and zero padding removal. While all of the techniques of this disclosure may be used in conjunction with the zero padding techniques, other techniques of this disclosure including the techniques for constructing substreams, techniques for determining a maximum syntax element size, and techniques for substream packing may be used without the described zero padding techniques.

While certain examples of video encoder 20 and/or video decoder 30 are described herein in the context of the DSC standard and/or upcoming ADSC standard, one having ordinary skill in the art would appreciate that systems and methods disclosed herein may be applicable to any suitable video coder or coding standard.

It is noted that video encoder 20, video decoder 30, and/or component(s) thereof illustrated in FIGS. 1A-1B, FIGS. 2A-2B, and/or FIGS. 6A-6B may be configured to perform one or more of the features of the SSM techniques described herein. For example, the SSM techniques described herein may be performed by a video encoder (e.g., video encoder 20 in FIG. 2A), a video decoder (e.g., video decoder 30 in FIG. 2B), or component(s) thereof, such as, for example, substream multiplexer 145 of video encoder 20 and/or substream demultiplexer 160 of the video decoder 30.

Video encoder 20, video decoder 30, and/or component(s) thereof may be implemented on a device that includes an integrated global memory shared by a plurality of programmable compute units that includes a buffer, wherein the buffer may include a first-in-first-out (FIFO) buffer. The device may further include an integrated circuit (IC) that may include at least one processor or processor circuit (e.g., a central processing unit (CPU)) and/or a graphics processing unit (GPU), wherein the GPU may include one or more programmable compute units. The device may be part of a system-on-chip (SoC), wherein the SoC may include a CPU that uses at least one reduced instruction set computing (RISC) instruction set. The SoC may include multiple CPU cores and GPUs.

In one example of the disclosure, video encoder 20 may be configured to encode a block of video data (e.g., an 8×2 or other size block of video data) in four substreams, wherein one substream (e.g., substream 0, or a "first substream") is used for signaling header and coding mode associated information, and wherein the other three substreams (e.g., substreams 1, 2, and 3, or a "second," "third," and "fourth" substream) are used for encoding three color components (e.g., YCoCg). The header information may include bits used to indicate the coding mode information, flatness information, or any other overhead information desired to be communicated to video decoder 30. Coding mode related information may refer to information that is specific to a particular coding mode. For example, the coding mode related information for BP mode might include block prediction vectors. For transform mode, the coding mode related information may include the intra prediction index, the transform partitioning index, etc.

In the context of this disclosure, the term "syntax element" may refer to all of the encoded information for a particular substream related to one block. That is, in the context of this disclosure, syntax element does not refer to one discrete piece of information, but rather all of the information for a block for a particular substream. Accordingly, maxSeSize refers to the maximum amount of coded information allowable for a particular substream for a particular block. Likewise, minSeSize refers to the minimum amount of coded information that may be coded for a particular substream for a particular block. In some examples, if video encoder 20 determines that more data than the defined maxSeSize is needed for a particular substream to code a block in a particular coding mode, video encoder 20 may disallow use of that particular coding mode that produces the excess syntax element size for that block (e.g., determine that particular coding mode is not usable for a particular block of video data).

In one example, instead of using a balance FIFO size of encoder balance FIFOs 202 of (muxWordSize+maxSeSize−1)*maxSeSize, the techniques of this disclosure described below may allow for a smaller balance FIFO size. In the present disclosure, the size of the balance FIFO (e.g., encoder balance FIFOs 202) is denoted by balanceFlFOSize, and video encoder 20 may be configured to configure or set balanceFlFOSize based on memory requirements of the codec (e.g., video encoder 20 and/or video decoder 30) and/or component(s) thereof.

In another example, when video encoder 20 is configured to use a balanceFIFOSize smaller than (muxWordSize+maxSeSize−1)*maxSeSize, video encoder 20 may be further configured to calculate an initial (block) delay as floor (balanceFlFOSize/maxSeSize) blocks, wherein floor(x) rounds x to the nearest integer such that floor(x)<=x.

During this initial delay time, video encoder 20 encodes blocks of a frame of video data and places the encoded bits for each respective substream into respective encoder balance FIFOs 202. However, during this time, video encoder 20 does not remove mux words from encoder balance FIFOs 202. In one example, the video encoder 20 may be configured to calculate the initial delay as floor(balanceFlFOSize/maxSeSize)−1. In general, the initial delay=floor(balanceFlFOSize/maxSeSize), which is an upper bound. Depending on the specific implementation, video encoder 20 may be configured with a particular initial delay less than or equal to the upper bound.

Figure 7:
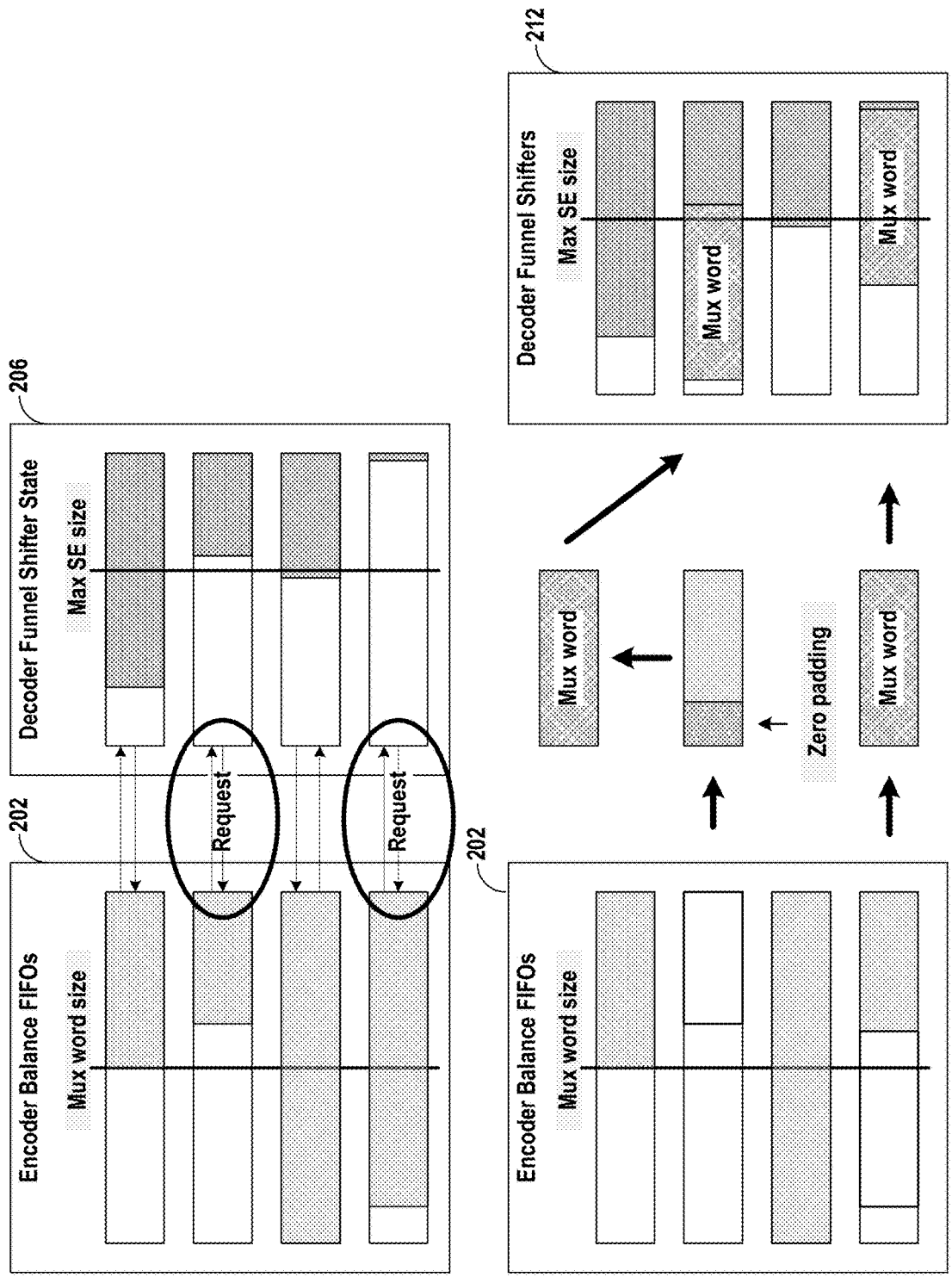
FIG. 7 is a conceptual diagram showing an example of mux word requests in substream multiplexing.

After the initial delay period is completed, video encoder 20 begins transmitting mux words to rate buffer 50 for transmission to video decoder 30, and also places these mux words into a funnel shifter demultiplexer model 206. With reference to the example of FIG. 7, if a particular encoder balance FIFO 202 does not contain enough bits to generate a mux word, in one example of the disclosure, video encoder 20 may be configured to insert zeros (e.g., zero bits) into the particular encoder balance FIFO 202 such that at least one mux word worth of data is available. FIG. 7 illustrates zero padding at the encoder side. In one example, for any substream for which an encoder balance FIFO 202 contains fewer than muxWordSize bits, video encoder 20 may be configured to perform zero padding such that that a mux word can be transmitted. The decoder funnel shifter state of demultiplexer model 206 shows the fullness of the decoder funnel shifters.

The number of padded zero bits may be calculated as muxWordSize-balanceFlFOFullness, where balanceFlFOFullness refers to the number of bits (or fullness) in the balance FIFO. The insertion of zeros in the FIFO prevents underflow. In another example, ones (i.e., one bits) can be stuffed in the FIFO to prevent underflow. In the rest of the present disclosure, it is assumed zero bits are used for padding in order prevent underflow. Nevertheless, the techniques described herein can be applied even when ones (one bits) are used for padding.

The zero bits which are placed in the FIFOs to generate a mux word are also counted towards the bit rate (since they are transmitted to video decoder 30). The balance FIFO size is typically selected in order to avoid frequent zero padding and excessive memory requirement. If the FIFO size is too small, then zero padding has to be performed frequently, which might take a significant portion of the bit rate, thereby directly impacting the performance. On the other hand, the frequency of the zero padding can be reduced with larger balance FIFO size, but this may increase the memory requirements. Therefore, it is desirable to carefully choose the FIFO size to achieve a balanced tradeoff between memory requirements and performance.

In related aspects, the size of the encoder balance FIFO itself may be reduced, whereas the size of the rate buffer will have no change. In this sense, the size of encoder balance FIFOs 202 and size of rate buffer 150 are orthogonal.

In examples that use zero padding, for successful decoding, video decoder 30 may be configured to first identify whether each mux word that is received is zero padded or not. If video decoder 30 identifies that a mux word is zero padded, then video decoder 30 may calculate the number of zero padded bits and then flush out the zero padded bits (e.g., remove them), since the zero padded bits are not part of the coded block data. In order to detect if a mux word is zero padded or not, and to calculate number the zero padding bits if the mux word is padded, video decoder 30 may be configured to determine the balance FIFO fullness state of the encode balance FIFOs for each substream. That is, video decoder 30 may be configured to run a model of video encoder operations to determine the balance FIFO fullness state of the encoder balance FIFOs. This would allow video decoder 30 to mimic the encoder operations. The balance FIFO fullness state is not an actual FIFO; rather, the balance FIFO fullness states is a value that provides the state of the encoder balance FIFO represented as the number of bits or fullness in the FIFO.

As noted above, in one example of operation by video encoder 20, zero padding occurs when the balanceFlFOFullness <muxWordSize. Therefore, at video decoder 30, whenever a mux word request is made, video decoder 30 may compare the balance FIFO Fullness State with muxWordSize. If balanceFlFOFullness<muxWordSize, then video decoder 30 determines that the current mux word is zero padded and the number of zero padded bits would be the difference between the muxWordSize and the number of bits in the balance FIFOs (inferred from balance FIFO Fullness State).

In addition to the balance FIFO fullness state, for each substream, video decoder 30 may be configured to store the mux word request times in an additional FIFO. The mux word request time refers to the time at which a mux word is requested from each substream. In one example, these request times may be represented using a block index or block timing. For each substream, the size of the request mux word FIFO may be bounded to a value of chosen initial delay.

The present disclosure describes the application of multiplexing techniques applied to four substreams, but is not so limited to a particular number of substreams. Examples of the video data contained in each of the four substreams for various different coding modes are described in more detail below. The techniques disclosed here can be applied to any number of substreams.

Video decoder 30 may initialize the balance FIFO fullness state to zero, since decoder funnel shifters 212 do not yet contain any valid data, e.g., fullness may be zero. In addition, the mux word request time FIFOs may also be empty in their initial state.

Figure 8:
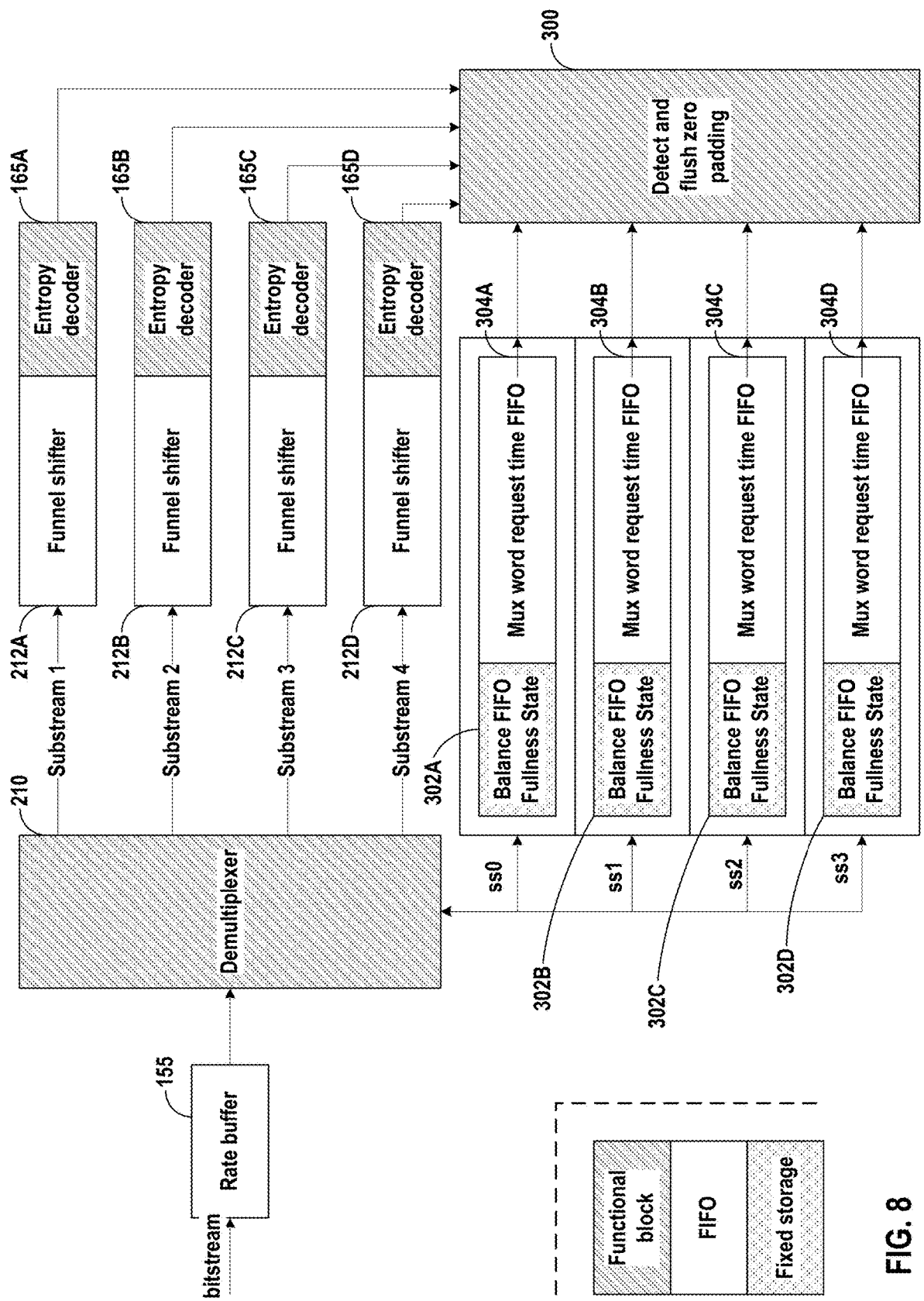
FIG. 8 is a conceptual diagram showing substream demultiplexing in a video decoder according to one example of the disclosure.

FIG. 8 is a block diagram showing an example video decoder 30 that may be configured to perform the zero padding SSM techniques of this disclosure. In FIG. 8, hashed blocks depict structures that perform the SSM functions, white blocks depict FIFO buffers, and dotted blocks depict fixed storage. In addition to the structures shown in FIG. 6B, video decoder 30 in the example of FIG. 8 may be further configured with a circuit 300 configured to detect and flush zero padding in accordance with the techniques of this disclosure. Video decoder 30 may also include additional FIFOs and fixed storage for each substream. For example, video decoder 30 may include balance FIFO fullness state memories 302A, 302B, 302C, and 302D (collectively, balance FIFO fullness state memories 302) for each respective substream. FIFO fullness state memories 302 may be any type of memory or storage, including a register. Video decoder 30 may further include mux word request time FIFOs 304A, 304B, 304C, and 304D (collectively, mux word request time FIFOs 304). The decoder operations of video decoder 30 may begin by requesting one mux word for each substream (e.g., substreams 0-4, labeled as ss0, ss1, ss2, and ss3 in FIG. 8), which are loaded into the SSPs. Each SSP may include a funnel shifter 212 and an entropy decoder 165. Each SSP may remove one syntax element worth of data (e.g., number of bits required to decode a single block) during each block time. The number of removed bits may be used to increment the respective balance FIFO fullness state memories 302.

Furthermore, video decoder 30 may be further configured to add the mux word request times to mux word request time FIFOs 304 for each respective sub stream. For each block time, video decoder 30 may remove one syntax element worth of data and the number of bits removed from the respective funnel shifter 212 are used to increment the respective balance FIFO fullness state memory 302. If any of the funnel shifter fullness values becomes less than the maxSeSize, then a mux word may be taken from rate buffer 155 and placed in the respective SSP and the request time may be added to the respective mux word request time FIFO 304.

When the current block index equals the initial delay, video decoder 30 checks (e.g., using detect and flush zero padding circuit 300) whether the first mux word it has received is zero padded or not. In order to make this determination, video decoder 30 may be configured to check each of the balance FIFO fullness state memories 302 and determine if the fullness of each encoder balance FIFO 202 at video encoder 20 is smaller than muxWordSize. If the fullness of each encoder balance FIFO 202 is smaller than muxWordSize, then video decoder 30 may determine that the mux word in the respective substream is zero padded and the number of zero padded bits would be the difference between the muxWordSize and the value of the balance FIFO fullness state.

Video decoder 30 (e.g., using detect and flush zero padding circuit 300) uses the calculated number of padded bits to flush the zero bits in the respective funnel shifter 212. Furthermore, the respective balance FIFO fullness state memory 302 is set to zero. If the fullness of the balance FIFO is not smaller than the muxWordSize, then video decoder 30 determines that the mux word is not zero padded. In this case, video decoder 30 decrements the respective balance FIFO fullness state memory 302 by muxWordSize. Once this process is completed, video encoder 20 removes the first element in the respective mux word request time FIFO 304. As noted above, for each sub stream, the first element in a respective mux word request FIFO 304 would be zero, as video decoder 30 requests one mux word from each substream initially. With this procedure, video decoder 30 can successfully identify and flush zero padding in the first mux word. Due to initial delay, video decoder 30 can check the zero padding in the first mux word when the decoder current block index is equal to the initial delay.

Figure 9:
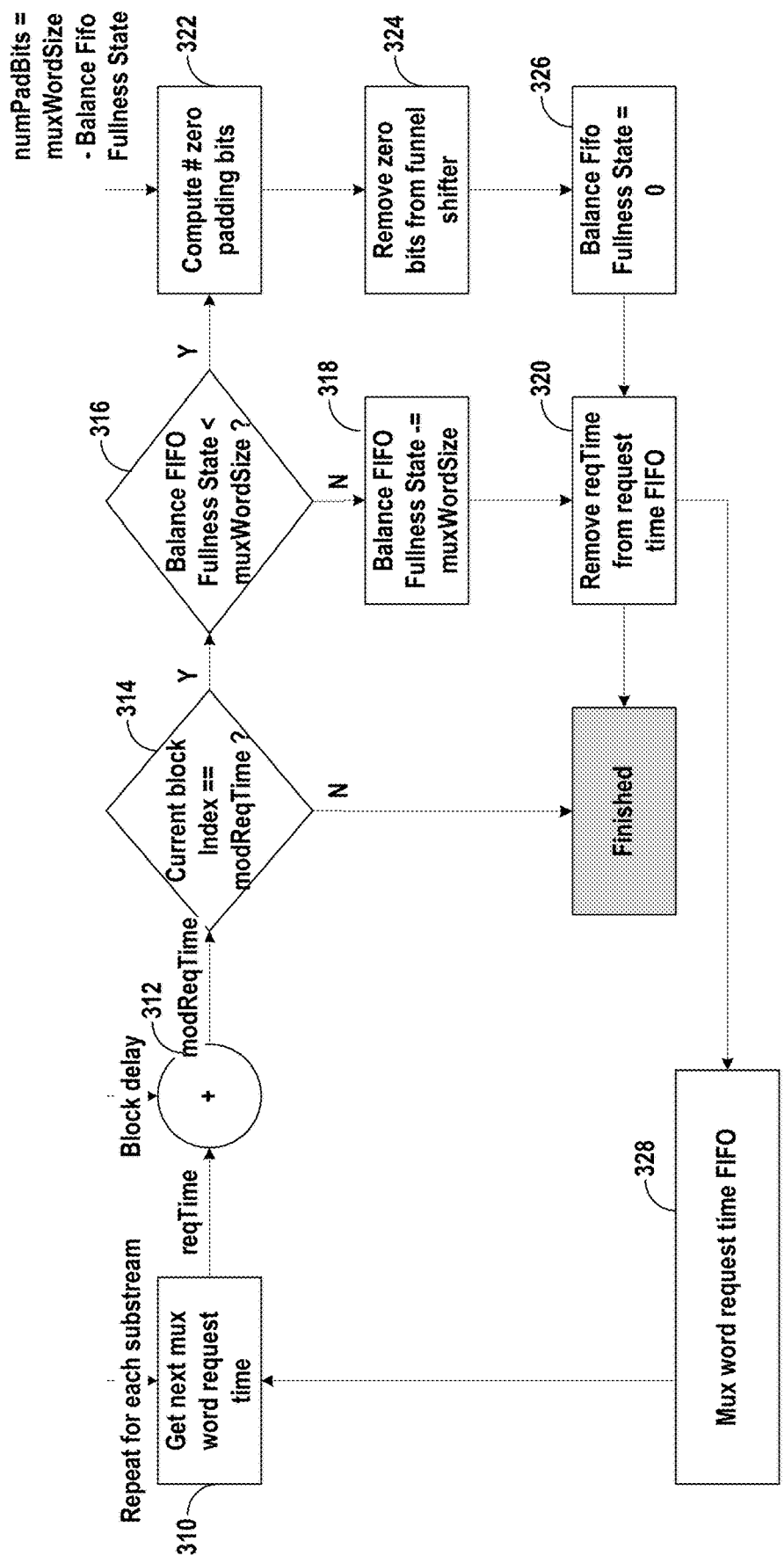
FIG. 9 is a flowchart showing an example substream demultiplexing process in a video decoder according to one example of the disclosure.

After the first mux word has been processed, video decoder 30 may perform the same procedure for detecting zero padding to each of the mux words. At each block time, video decoder 30 checks the entry at the "front" of the mux word request time FIFO 304. FIG. 9 is a flowchart illustrating an example process for detecting zero padding and flushing padded bits at the decoder SSM. The process of FIG. 9 may be performed by video decoder 30 and repeated for each substream. Video decoder 30 may first determine (310) the next mux word request time (reqTime). Video decoder 30 may then add (312) the reqTime to the SSM block delay (blockDelay) to determine the decoder's relative request (modReqTime). Since there is a delay between video encoder 20 and video decoder 30, video decoder 30 adds blockDelay to the request time to determine the decoder's relative request time. Video decoder 30 then determines if the current block index is equal to the modReqTime (314). If no, the process is finished. If yes, video decoder 30 checks whether the balance FIFO fullness state is smaller than muxWordSize (316) in order to identify and flush the padded bits, if any, as described above.

If the balance FIFO fullness state is less than the muxWordSize (i.e., padding is detected), video decoder 30 computes (322) the number of zero padding bits (numPadBits). Video decoder 30 may compute numPadBits by subtracting the value of the balance FIFO fullness state from muxWordSize. Video decoder 30 may then remove the calculated number of zero padding bits from the respective funnel shifter (324). Video decoder 30 may then set the value of the balance FIFO fullness state to zero (326). Video decoder 30 may further remove the respective request time from the mux word request time FIFO (320). The process is then finished and the substream for the block of video data may be decoded with the padding bits removed. Additionally, video decoder 30 may update the mux word request time FIFO (328).

If the balance FIFO fullness state is not less than muxWordSize (i.e., no padding is detected), video decoder 30 decrements (318) the value of the balance FIFO fullness state memory by muxWordSize (balance FIFO fullness state−=muxWordSize). Video decoder 30 may further remove the respective request time from the mux word request time FIFO (320). The process is then finished and the substream for the block of video data may be decoded. Additionally, video decoder 30 may update the mux word request time FIFO (328).

Figure 10:
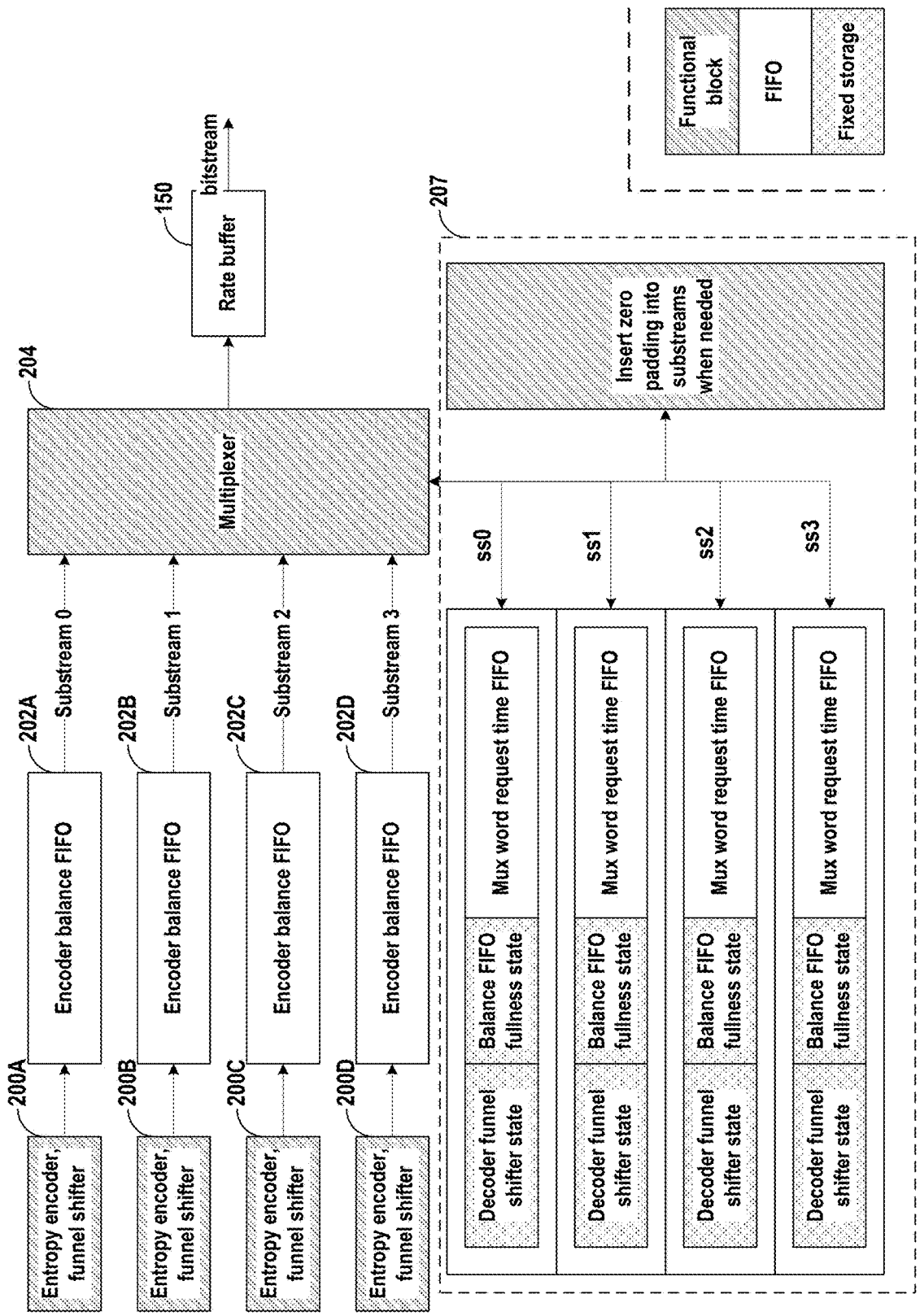
FIG. 10 is a block diagram showing substream multiplexing in a video encoder according to one example of the disclosure.

FIG. 10 is a block diagram showing an example video encoder 20 that may be configured to perform the zero padding SSM techniques of this disclosure. In FIG. 10, hashed blocks depict structures that perform the SSM functions, white blocks depict FIFO buffers, and dotted blocks depict fixed storage. In addition to the structures shown in FIG. 6A, video decoder 30 in the example of FIG. 8 may be further configured with a different demultiplexer model 207. In particular, demultiplexer model 207 includes a model of the SSM demultiplexer process performed by video decoder 30 of FIG. 8. For example, using demultiplexer model 207, video encoder 20 may determine when to insert zero padding into the substreams. In addition, video decoder 30 may track mux word request times and balance FIFO fullness states, as would be determined by video decoder 30, in each of the respective bitstreams. Like the example of FIG. 6A, video encoder 20 may also track the decoder funnel shifter state for each respective bitstream. In the example of FIG. 10, video encoder 20 may be configured to perform encoder SSM techniques where the demultiplexer model described above with reference to FIG. 8 and FIG. 9 is used to generate mux words. Note that demultiplexer model 207 at video encoder 20 generates the mux words using both the modeled balance FIFO fullness state and mux word request time FIFO of video decoder 30, in addition to the SSPs (e.g., the decoder funnel shifter state).

As the block timings are different between video encoder 20 and video decoder 30 due to delays, e.g., the initial SSM delay, demultiplexer model 207 at video encoder 20 is configured to account for the delay. For example, when video encoder 20 receives a mux word request from demultiplexer model 207 (e.g., based on a determination that video decoder 30 will request a mux word at this time), the respective request time may be represented and stored in the mux word request time FIFO in terms of encoder block timing or in terms of decoder block timing. As an example, after the initial delay, video encoder 20 may place the first mux words to each SSP. Thus, the mux word request time in terms of encoder timing would be equal to the initial delay. Video decoder 30 would receive the first mux word at block time zero; thus, the request time is zero in terms of decoder block timing. Therefore, the mux word request time and the current block index shown in the example of FIG. 9 is modified as they are represented in terms of decoder block timing.

In one example, demultiplexer model 207 at video encoder 20 may store the mux word request time in the FIFOs in terms of encoder block timing. When this example technique is used, the modReqTime in the example of FIG. 9 may be set equal to reqTime. Also, to account for initial delay, the current block index in FIG. 9 may be modified and may be calculated as (encoder current block index)−(initial delay).

Figure 11:
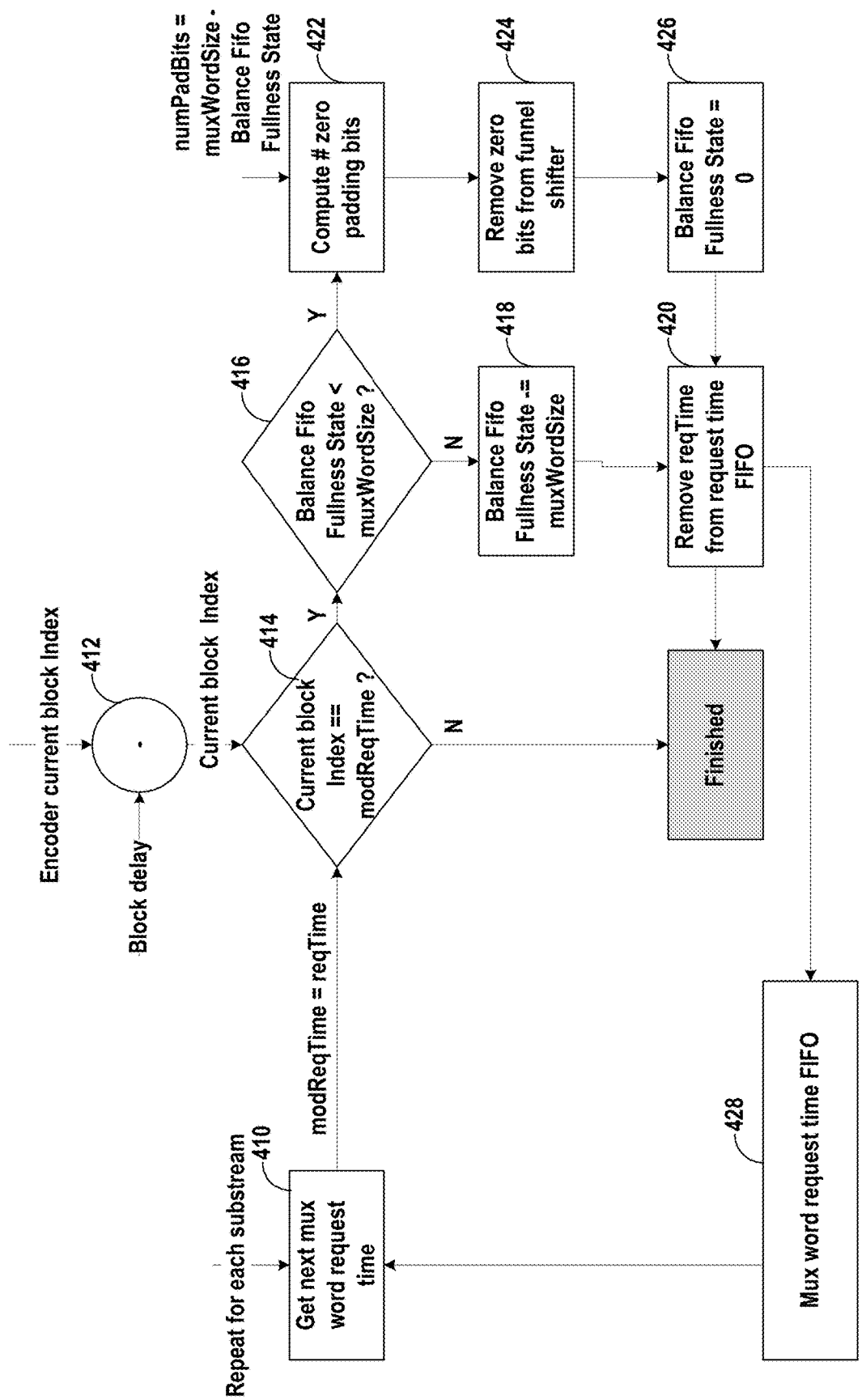
FIG. 11 is a flowchart showing an example substream multiplexing process in a video encoder according to one example of the disclosure.

For sake of clarity, an example flowchart of detecting and flushing zero padding of demultiplexer model 207 used at video encoder side 20 shown in the example of FIG. 11 (detection and flushing of zero padding of the de-multiplexer model used at the encoder side). Here, mux word request times are stored in terms of encoder block timing and the encoder current block index is subtracted from the block delay to account for the initial delay. It is important to note that FIG. 11 illustrates a specific example implementation. Other applicable techniques may be implemented to account for the initial delay to build the demultiplexer model used at video encoder 20.

The process of FIG. 11 may be performed in demultiplexer model 207 of video encoder 20 and may be repeated for each substream. Video encoder 20 may first determine (410) the next mux word request time (reqTime). As noted above, modReqTime may be set equal to reqTime. Video encoder 20 may subtract (412) the block delay from the encoder current block index to determine the current block index. Video encoder 20 then determines if the current block index is equal to the modReqTime (414). If no, the process is finished. If yes, video encoder 20 checks whether the balance FIFO fullness state is smaller than muxWordSize (416) in order to identify if padded bits are needed or not.

If the balance FIFO fullness state is less than the muxWordSize (i.e., padding is needed), video encoder 20 computes (422) the number of zero padding bits (numPadBits). Video encoder 20 may compute numPadBits by subtracting the value of the balance FIFO fullness state from muxWordSize. Video encoder 20, in demultiplexer model 207, may then remove the calculated number of zero padding bits from the respective funnel shifter (424). Video encoder 20 may then set the value of the balance FIFO fullness state to zero (426). Video encoder 20 may further remove the respective request time from the mux word request time FIFO (420). The process is then finished. Additionally, video encoder 20 may update the mux word request time FIFO (428).

If the balance FIFO fullness state is not less than muxWordSize (i.e., no padding is not needed), video encoder 20 decrements (418) the value of the balance FIFO fullness state memory by muxWordSize (balance FIFO fullness state−=muxWordSize). Video encoder 20 may further remove the respective request time from the mux word request time FIFO (420). The process is then finished. Additionally, video encoder 20 may update the mux word request time FIFO (428).

Figure 12:
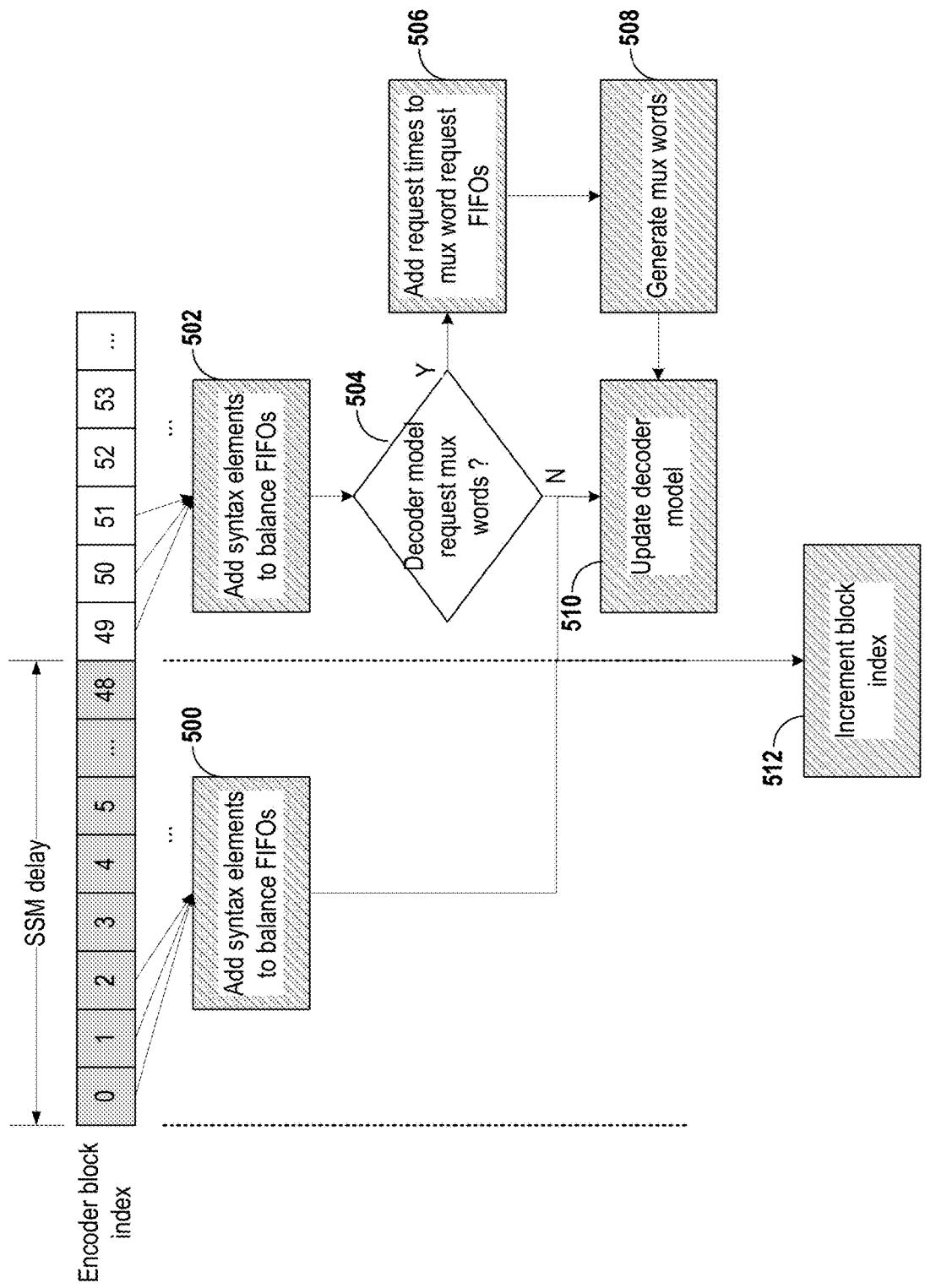
FIG. 12 is a flowchart showing an example substream multiplexing process in a video encoder according to one example of the disclosure.

FIG. 12 provides an example flowchart for SSM encoding operations. During the initial delay period, video encoder 20 adds (500) syntax elements for the various coded blocks (e.g., as indicated by the encoder block index) for each of the substreams being encoded. Video encoder 20 continues to add (502) syntax elements for the various coded blocks for each of the substreams being encoded after the initial SSM delay period. When demultiplexer model 207 requests (504) a mux word, video encoder 20 generates (508) the mux words and places the mux word in rate buffer 150 and also in the funnel shifter of demultiplexer model 207. The request times are also added to request mux word FIFOs (506). Demultiplexer model 207 then adjusts the funnel shifter fullness based on the syntax element size. Finally, demultiplexer model 207 will detect and flush zero padded bits, which are used to update the encoder balance FIFO fullness state and funnel shifter fullness state, as described above (510). Video encoder 20 may also increment the block index as each block is encoded (512). When demultiplexer model 207 does not receive a request for a mux word (504), video encoder 20 updates the encoder balance FIFO fullness state and funnel shifter fullness state, as described above (510). Video encoder 20 also updates the encoder balance FIFO fullness state and funnel shifter fullness state after adding syntax elements to the balance FIFOs during the SSM delay.

When all of the SSPs request a mux word, video encoder 20 may choose a specific order to insert the mux words into the bitstream. For example, in one implementation the mux words are generated in the following order first from substream 0, then from substream 1, followed by substream 2, and at last from substream 3. The same ordering may be used at the decoder side as well. Alternative ordering may be utilized so long as the same ordering is used at encoder and decoder sides.

In accordance with one or more aspects of the present disclosure, the sub streams in SSM may be constructed for various modes by considering the following aspects. The following techniques may be used with or without the zero padding substream multiplexing techniques discussed with reference to FIGS. 8-12. That is, the following techniques may be used in situations where zero padding is not used (e.g., FIG. 6A and FIG. 6B) or in situations where zero padding is used (e.g., FIGS. 8-12).

In some examples, there may be a minimum dependency among the encoded substreams so that all the substreams may be parsed and decoded in parallel. That is, the data in one substream is generated such that the data in that substream is not needed to decode data in another substream. Even if there exists some dependency, video encoder 20 may be configured to signal the dependent information early in the substreams (e.g., early in substream 0), so that the wait time or any critical paths can be reduced. For example, video encoder 20 may be configured to signal coding mode information bits first in substream 0, so that once the coding mode information is decoded, video decoder 30 may use such information to parse the remaining substreams and decode the information therein. In another example of the disclosure, when zero padding is used, the expected (e.g., predefined) substream lengths should be roughly balanced or equal so that the amount of zero padding can be minimized.

In one specific implementation, for certain modes used in display stream compression, four substreams may be utilized and constructed as described herein. In the present example, the block size is assumed to be 8×2 (width: 8 pixels, height: 2 pixels).

FIGS. 13-19 show example substreams for different coding modes. In FIGS. 13-19, syntax elements shaded according to the FLC legend are coded using fixed-length coding. Syntax elements shaded according to the VLC legend are coded using variable-length coding. Syntax elements shaded according the group legend are entropy coding groups, as will be defined in more detail below.

Figure 13:
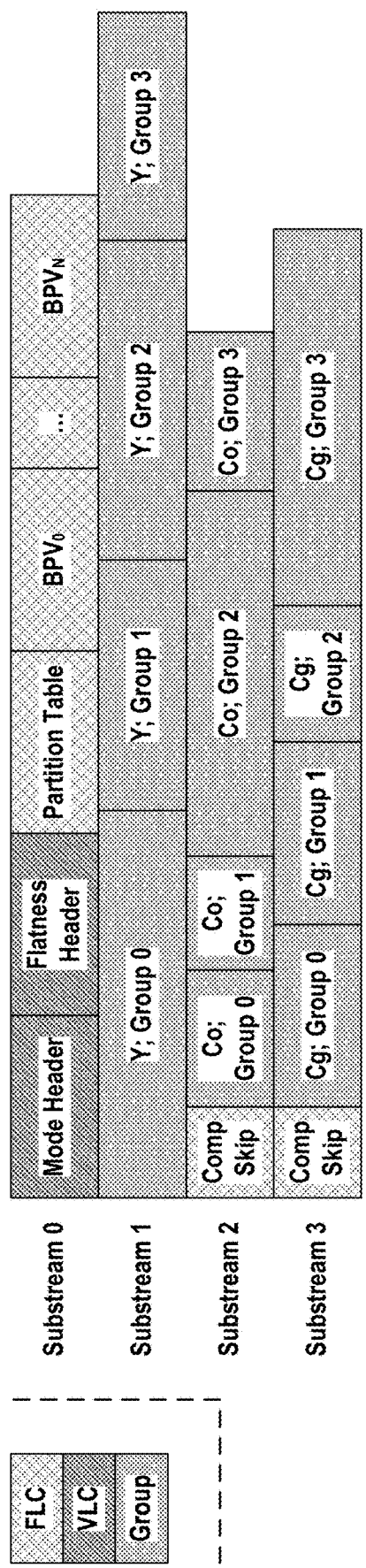
FIG. 13 is a conceptual diagram showing an example substream construction for block prediction mode.

As shown in the example of FIG. 13, for BP mode, substream 0 may contain header information (e.g., coding mode signaling and flatness signaling), partition information (e.g., a partition table), and/or block prediction vectors ($BPV_0$, $BPV_1$, . . . , $BPV_x$). In the example of FIG. 13, the partition information length is 4 bits, which indicates whether each 2×2 sub-block is further partitioned into 1×2 sub-blocks. Substreams 1, 2, and 3 may contain encoded information from the three color components (e.g., Y, Co, and Cg, respectively) of the pixels of the block being coded. YCoCg color format is just one example. Substreams 1, 2, and 3 may include encoded information of any color format desired (e.g., RGB, YCrCb, YUV, etc.). In addition, for the chroma components in substreams 2 and 3, a component skip flag may be signaled that indicates whether or not the substream includes any prediction residuals.

Figure 14:
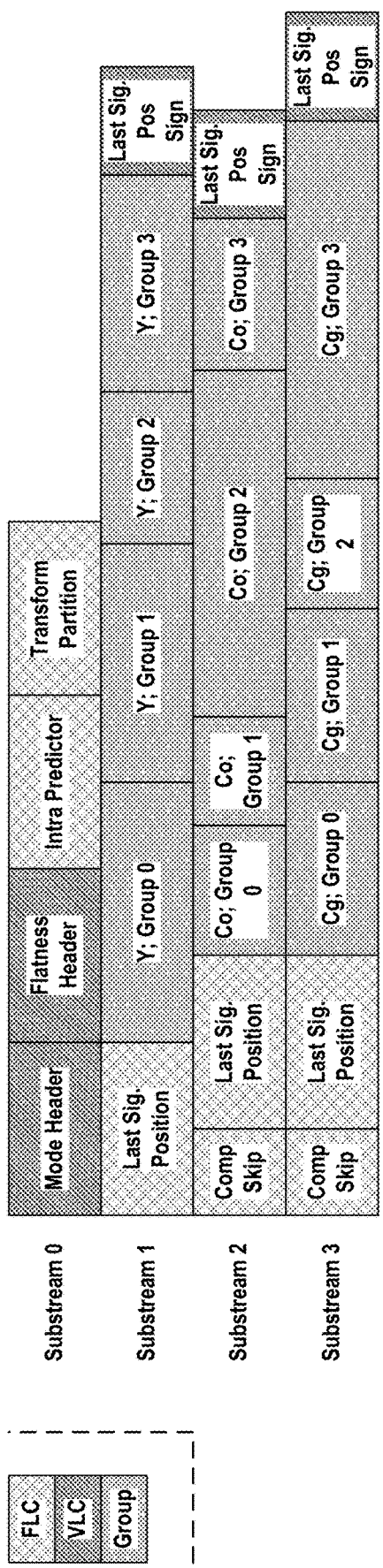
FIG. 14 is a conceptual diagram showing an example substream construction for transform mode.

As shown in the example of FIG. 14, for transform mode, substream 0 may contain header information (e.g., coding mode signaling and flatness signaling), an intra prediction index, and/or a transform partition index. Substreams 1, 2, and 3 may contain coded information from the three color components (e.g., Y, Co, and Cg, respectively) of the pixels of the block being coded. For transform mode, each of sub streams 1, 2, and 3 may include encoded information that indicates the position (Last Sig. Position) of the last significant coefficient (e.g., a non-zero transform coefficient) in the block as well as the sign value of the last significant coefficient (Last Sig. Pos Sign). In addition, for the chroma components in substreams 2 and 3, a component skip flag may be signaled that indicates whether or not the substream includes any significant transform coefficients.

Figure 15:
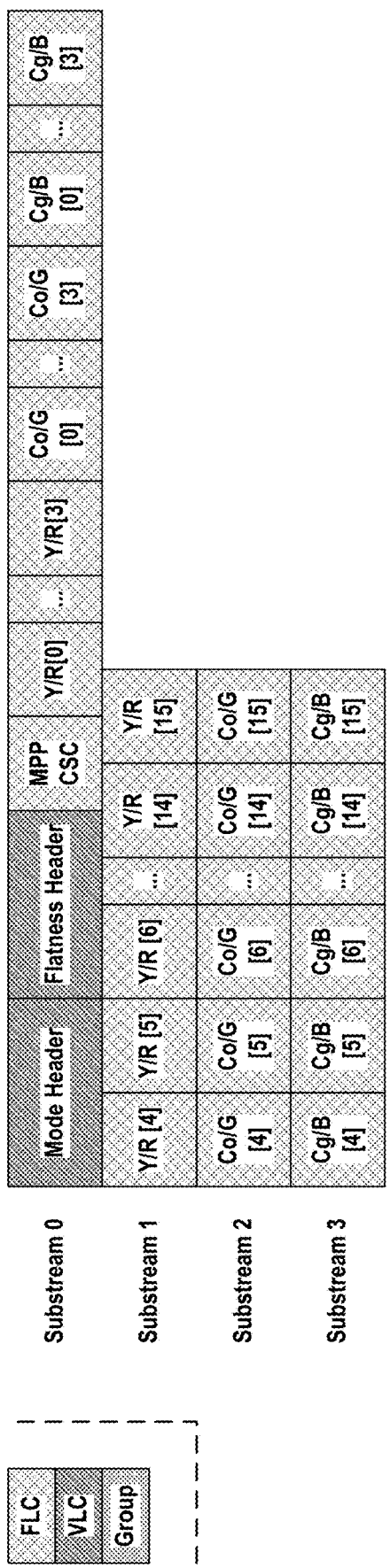
FIG. 15 is a conceptual diagram showing an example substream construction for mid-point prediction mode.

As shown in the example of FIG. 15, for MPP mode, substream 0 may contain header information (e.g., coding mode signaling and flatness signaling), a color space used for MPP mode (e.g., color space conversion (CSC)), and/or four samples from each of the three color components. In one example, the four samples may be the first four samples of the block. Substreams 1, 2, and 3 may contain encoded information from the remaining twelve samples of the 8×2 block from the three color components. Depending on the color space used for MPP mode, the three color components can be, for example, Y, Co, and Cg, respectively (or R, G, and B, respectively).

Figure 16:
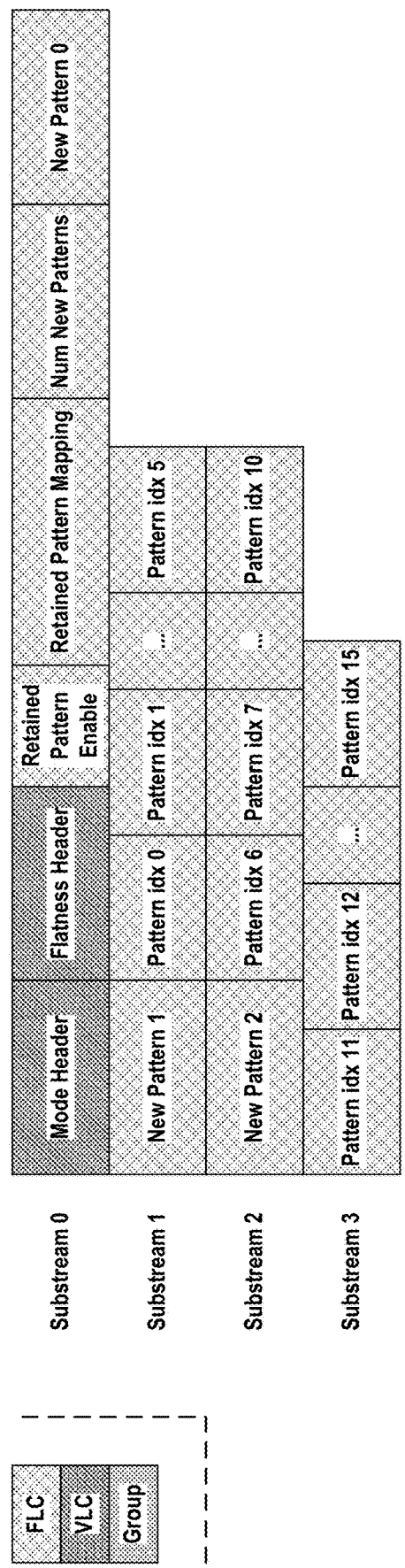
FIG. 16 is a conceptual diagram showing an example substream construction for pattern mode.

As shown in the example of FIG. 16, for pattern mode, substream 0 may contain header information (e.g., coding mode signaling and flatness signaling), bits associated with the retained patterns in the previous dictionary, etc. This may include 1-bit to signal whether any pattern in the previous dictionary is retained or not (Retained pattern enable). If any pattern is retained then the 1-bit each for the individual patterns in the previous dictionary (Retained pattern mapping) may be signaled. In addition, the number of new patterns (Num New Patterns) is also signaled in substream 0. The new patterns are distributed equally among the four substreams, starting from substream 0, 1, 2, and 3 (in order). As an example, in FIG. 16, three new patterns are signaled in the first three substreams 0, 1, and 2 denoted as New Patterns 0, 1, and 2, respectively.

The pattern indices (pattern idx) are distributed equally among the substreams 1, 2, and 3. As there are 16 patterns indexes in a block, one way would be signal 6 indexes in substream 1, 5 indexes in substream 2 and the remaining 5 indexes in substream 3, as shown in the example of FIG. 16.

Figure 17:
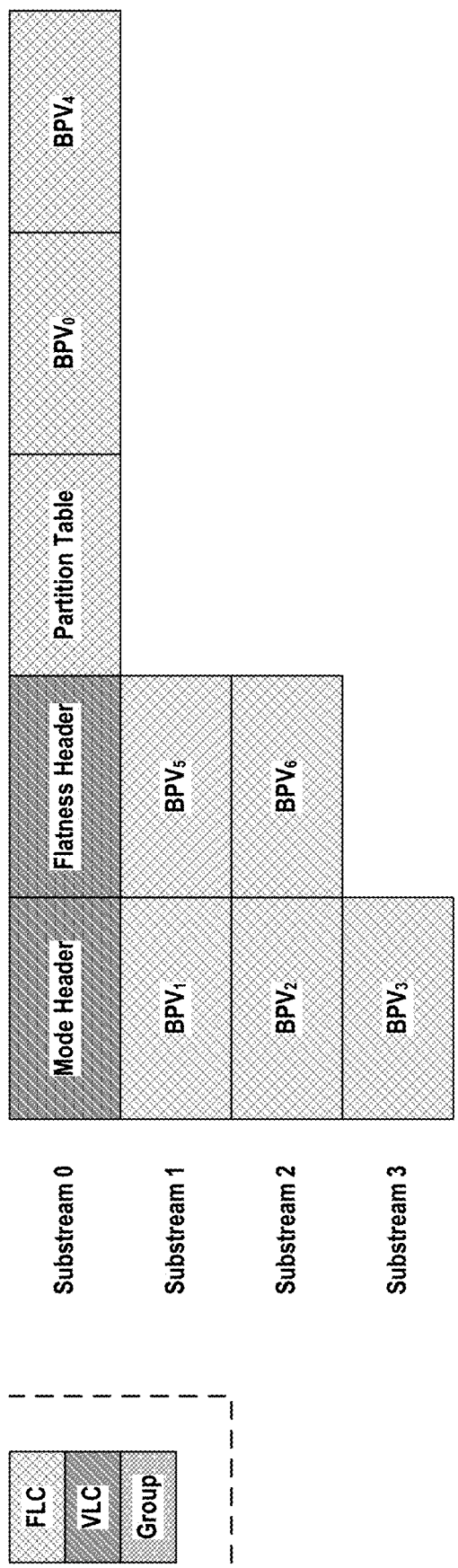
FIG. 17 is a conceptual diagram showing an example substream construction for block prediction skip mode.

BP skip mode is a special case of BP mode, where the residuals are not encoded. FIG. 17 shows example substreams for BP skip mode. Substream 0 may contain header information (e.g., coding mode signaling and flatness signaling), partition information (e.g. a partition table), etc. The block prediction vectors (BPV) are distributed equally among the four streams, starting from substream 0, 1, 2, and 3 (in order). As an example, when BP vectors are coded for each 2×1 sub-blocks, the 8 BP vectors for block size of 8×2 are put in the substreams as shown in the example of FIG. 17.

Figure 18:
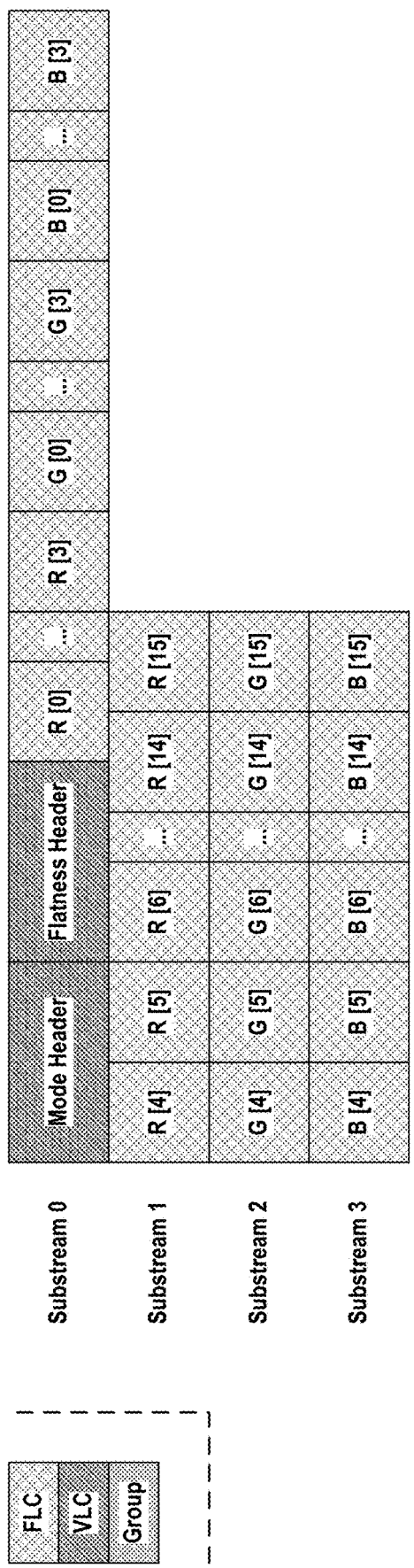
FIG. 18 is a conceptual diagram showing an example substream construction for mid-point prediction fall back mode.

MPPF mode is a special case of MPP mode, where the residuals in the MPPF are encoded using a fixed-size quantizer. As shown in the example of FIG. 18, the sub streams for MPPF may be constructed in a similar way as in MPP mode.

Figure 19:
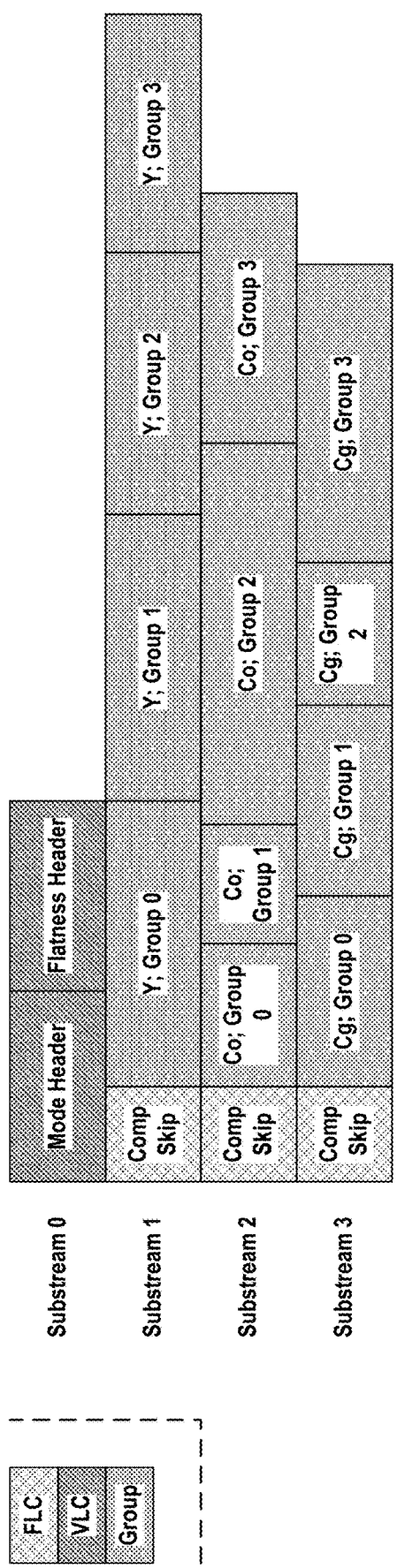
FIG. 19 is a conceptual diagram showing an example substream construction for differential pulse code modulation mode.

As shown in the example of FIG. 19, for DPCM mode, substream 0 may contain header information (e.g., coding mode signaling and flatness signaling), whereas substreams 1, 2, and 3 respectively may contain encoded information from the three color components (e.g., Y, Co and Cg, respectively). Each of substreams 1, 2, and 3 may include a component skip flag to indicate if there is any prediction residual for that substream of the block.

In order to prevent rate buffer underflow, zero padding may be implemented in rate buffer 150 with one or more aspects of the display stream compression techniques described herein. When this occurs the numbers of zero padded bits are distributed equally to all the substreams, starting from substream 0, 1, 2, and 3 in order. Note that this zero padding in the rate buffer is different from the zero padding discussed above. In other examples, zero padding bits may be added to only substreams 1-3 (e.g., substream zero is not zero padded).

For the sake of clarity, and for illustrative purposes, suppose the number of zero padded bits is numPadBits and the number of substreams is 4. One way to equally distribute numPadBits bits to 4 substreams is to iterate through the substreams circularly by adding one bit at a time. The pseudo-code for such an implementation is provided below.

```
Int subStreamIdx = 0;
Int numSubStreams = 4;
    for (Int i = 0; i < numPadBits; i++)
    {
        //add a single zero bit in subStreamIdx
        AddZeroBit(substreamIdx);
            //update subStreamIdx
            subStreamIdx = (subStreamIdx + 1) % numSubStreams;
    }
```

Figure 20:
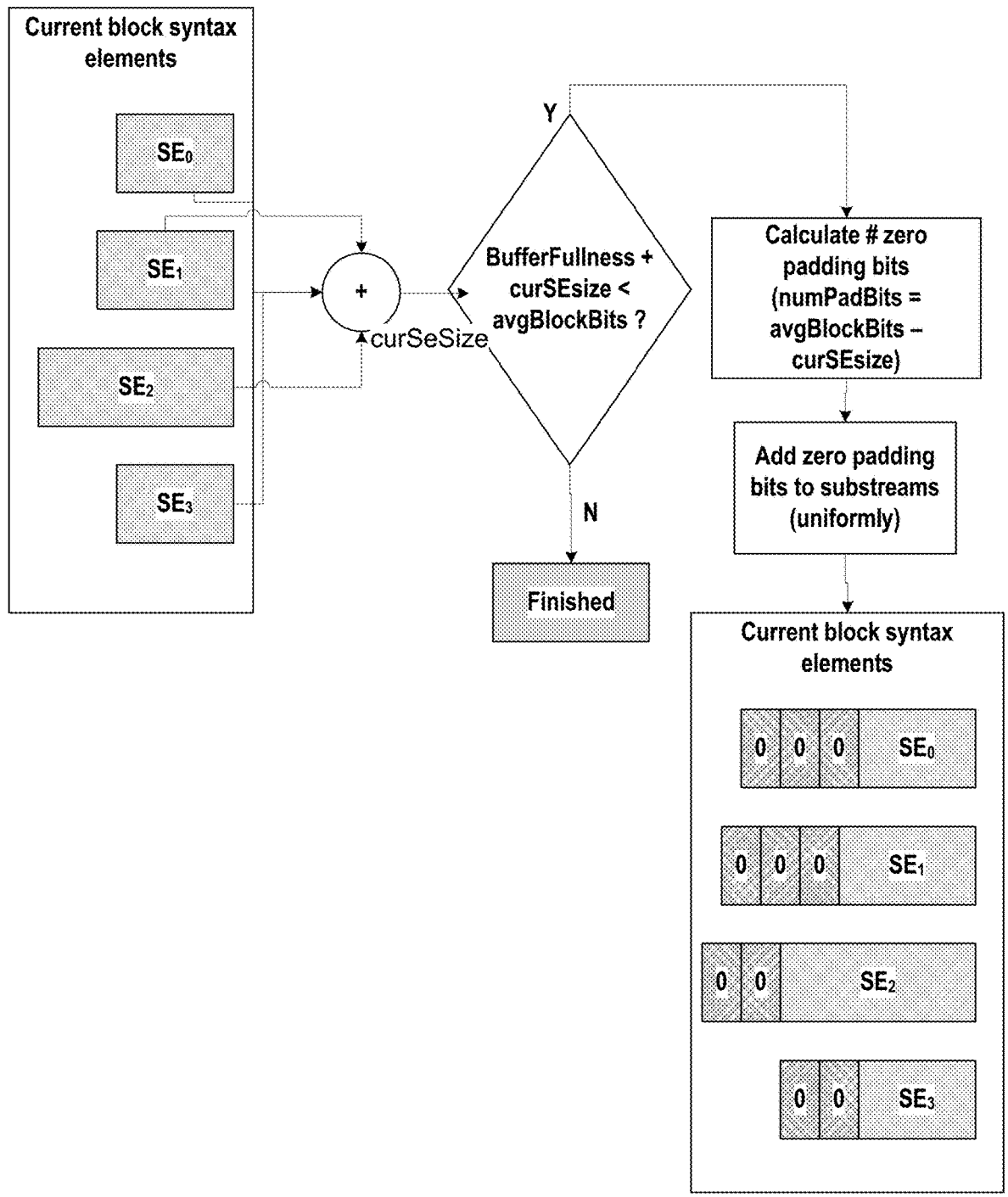
FIG. 20 is a flowchart showing example process of zero padding in a rate buffer.

An illustration of adding zero padded bits in the four substreams is shown in the FIG. 20. The zero padded bits are inserted to prevent rate buffer underflow. In the example of FIG. 20, CurSESize indicates the total number of bits required to code a particular block, BufferFullness indicates the fullness of the rate buffer. Rate buffer 150 removes a constant number of bits at every block time which is given by avgBlockBits. For example, avgBlockBits is 96 for a block size of 8×2 and target bit rate of 6 bpp. As shown in FIG. 20, when the BufferFullness+curSESize is less than the avgBlockBits, zero padding is performed in rate buffer 150 to prevent underflow. Inserting numPadBits number of zero bits ensures that rate buffer 150 does not underflow. The padding bits are then equally distributed to each substream as described above.

For the sake of clarity, and for illustrative purposes, the zero padding technique of FIG. 20 is shown using four substreams; however, the same technique can be applied to any number of substreams.

In another example of rate buffer zero padding, a pre-defined padding size may be determined (e.g. a 16 bit padding word). Video encoder 20 may be configured to place two of these padding words into each of substreams 1, 2, 3. The number of bits (in this case, 16) is chosen such that 6*n=avgBlockBits. For 6 bpp compression, avgBlock-Bits=96. Video encoder 20 may be configured to signal the size of the rate buffer padding among picture parameter set (PPS) parameters.

As described above, the mux word size is chosen such that it is greater than or equal to maxSeSize. Increasing maxS-eSize will therefore necessitate a larger muxWordSize, which will increase the balance FIFO size (e.g., the amount of memory needed for encoder balance FIFOs 202). Also, the maxSeSize may increase the frequency of zero padding, which may affect the quality. Therefore, in one example of the disclosure, maxSeSize as a configurable parameter, so that mux word size and balance FIFO size can be controlled depending on the hardware requirements. That is, video encoder 20 may be configured to determine the maxSeSize for a given implementation.

While video encoder 20 selects a best coding mode for each block, video encoder 20 may be configured to disallow the coding modes whose syntax element size for a given substream is greater than the chosen maxSeSize. That is, video encoder 20 may determine which coding modes of the plurality of coding modes are useable or not useable based on a determination if a particular coding mode produces a syntax element size that is greater than the maxSeSize for the block. Video encoder 20 determines that coding modes that produce a syntax element size greater than the maxSeSize for any of the substreams are not useable for encoding the block. Video encoder 20 determines that coding modes that produce a syntax element size less than or equal to the maxSeSize for all of the substreams are useable for encoding the block. This ensures that the video decoder 30 will request at most one mux word from each substream in order to decode a single block. If a single block required more than one mux word of information, video decoder 30 would need to request multiple mux words to decode a single block.

Video encoder 20 may determine a best coding mode using a mode selection algorithm. Video encoder 20 determines the coding mode which minimizes the rate-distortion (RD) cost for a given block, subject to a few constraints. Example constraints may include:
1) Rate buffer will not underflow by selecting current mode
2) Rate buffer will not overflow by selecting current mode
3) If current mode is selected, there will be at least min-BlockBits available for each remaining block in the slice.

In one example, video encoder 20 may be preconfigured with a maxSeSize. The preconfigured maxSeSize may be determined offline and may be based on a desired performance level given a particular bpp. Experiments showed that, in general maxSeSize=126 works well for 6 bpp and maxSeSize=142 works well for 8 bpp and above. At low QP, both BP mode and transform mode may be too expensive (e.g., may require more bits than maxSeSize for certain blocks) and may be deselected or determined to be not useable by video encoder 20 based on they syntax element size (seSize) for a particular block being larger than the maxSeSize (e.g., seSize>maxSeSize). In general, the value of the preconfigured maxSeSize may be selected as a trade-off between supporting large syntax element size and minimizing the balance FIFO size.

In other examples, the preconfigured maxSeSize may be determined based on the largest expected syntax element size associated with the BP mode. However, this does not guarantee that BP mode will always be available. It may be possible that, for some blocks, BP mode will require a syntax element size that this larger than maxSeSize. In other examples, for low QP values, transform mode may have syntax element sizes larger than maxSeSize. When this occurs, video encoder 20 may disallow transform mode (e.g., determine that transform mode is not useable) for the current block during best mode selection. In other examples, video encoder 20 may be preconfigured to with a maxSeSize such that MPP mode if available for all blocks.

In certain edge cases, the above proposed substream packing or multiplexing techniques may be sub-optimal. For example, if the source data is grayscale (e.g., no chroma values), then frequent zero-padding may be utilized for Co (substream 2) and Cg (substream 3) to prevent substream components Co and Cg from underflowing, since these components may be coded using component-skip (one bit per substream per block). This is considered an edge case since grayscale images typically compress very well, and the drop is minor and may only be noticed using an objective metric, such as, for example, peak signal-to-noise ratio (PSNR). That is, no visual loss may be noticeable.

For handling such an edge case, another approach to substream packing may involve distributing the data for each component among multiple substreams. In one example, the entropy coding groups (EC groups) for a single component may be distributed among available substreams (e.g., among all or a subset of the available substreams). An EC group is a collection of one or more samples which are being grouped together for the sake of entropy coding. For example, for BP mode, an EC group includes four samples which have been grouped together and will share a prefix in the bitstream. For transform mode, the number of samples per EC group is variable, due to the expected magnitude of coefficients with certain frequency information.

For example, luma EC group 0 may be placed in substream 0, luma EC group 1 in substream 1, etc. In the same way, the chroma components may also be distributed among the available substreams. In another example, the EC groups may be distributed among the substreams such that the expected mismatch between syntax element lengths of the different substreams will be minimized.

By implementing such packing techniques, an imbalance between the sizes of the three components may result in less frequent zero padding. Such packing techniques may be associated with a slight increase in the dependency between substreams, which can be handled with, for example, additional logic in the substream demultiplexer.

In one example, hybrid entropy methods may be used on top of an alternate substream packing method. Recall, when an alternate substream packing method is used, all the groups in each substream may not be from the same components because of scrambling. When hybrid entropy coding is applied, in one example, the last group in each substream may use two's complement representation, while the first three groups (in the same sub stream) may use sign magnitude representation. The hybrid entropy methods may be desirable because such methods allow meeting the throughput requirements. Therefore, hybrid entropy methods may not be applied to the substream that carries the header information (e.g., substream 0)—typically, header information includes mode, flatness signaling etc. Also, the hybrid methods may not be applied to the modes that use fixed length codes, e.g., pattern, MPP, MPPF.

In another example, the decision whether to use two's complement or sign-magnitude representation (e.g., hybrid entropy coding method) is based on the number of groups having non-zero symbols in the same substream. In one example, two's complement representation is used for the last group only if each of the first three groups in the same substream has at least one non-zero coefficient. Otherwise, sign-magnitude representation is used. Two's complement representation is used only when necessary to achieve the desired throughput as it deteriorates the coding efficiency.

Figure 21:
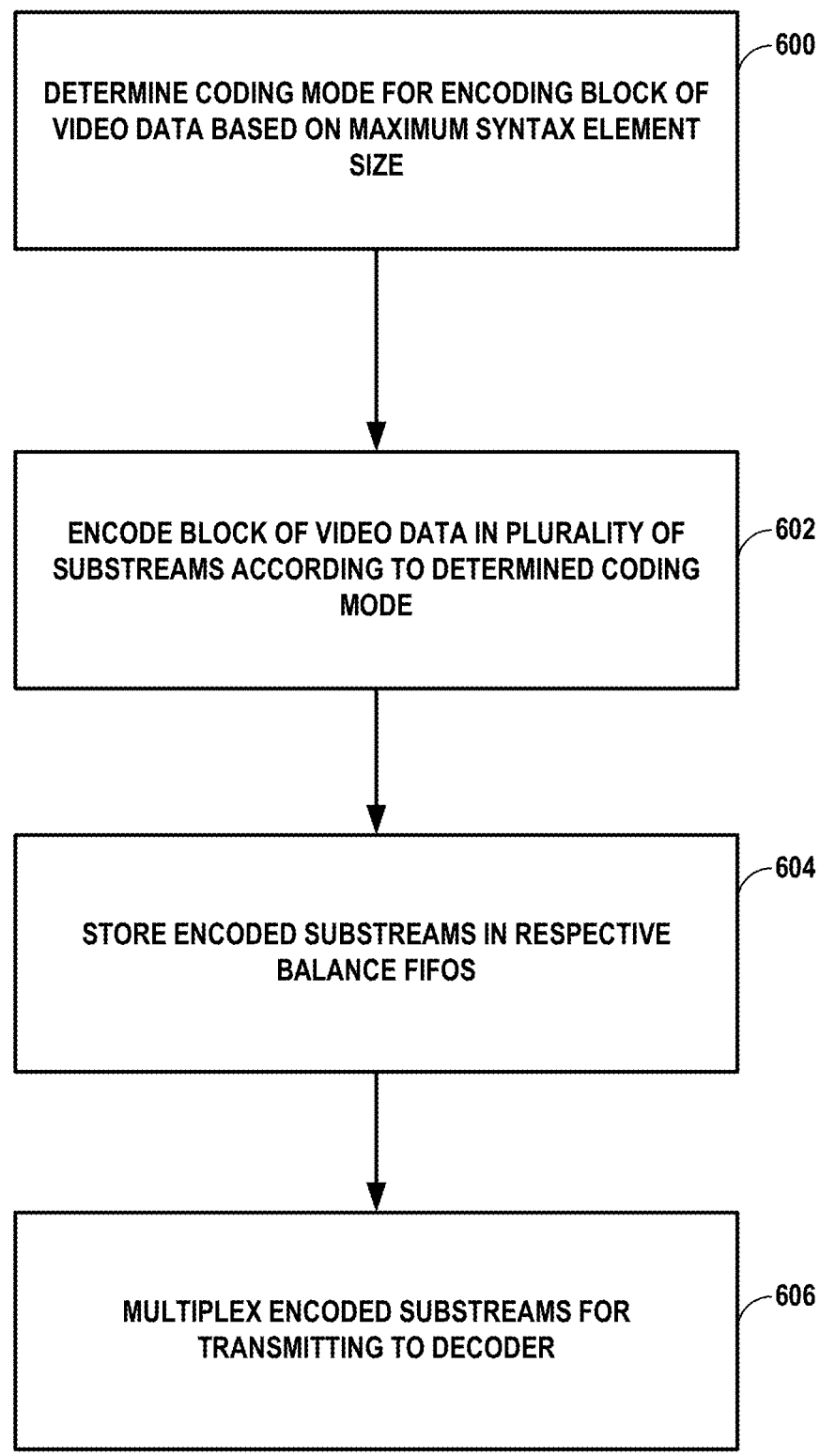
FIG. 21 is a flowchart showing an encoding method according to one example of the disclosure.

FIG. 21 is a flowchart showing an encoding method according to one example of the disclosure. The techniques of FIG. 21 may be performed by one or one structural components of video encoder 20, consistent with the various examples described above.

In one example of the disclosure, video encoder 20 may be configured to determine a coding mode for encoding the block of video data from among one or more coding modes, wherein the coding mode is determined based on a maximum syntax element size (600). Video encoder 20 may be further configured to encode the block of video data in a plurality of substreams according to the determined coding mode to create a plurality of encoded substreams of video data (602). Video encoder 20 may be further configured to store the plurality of encoded substreams of video data in respective balance first-in, first-out (FIFO) buffers (604), and multiplex the plurality of encoded substreams in a bitstream for transmitting to a video decoder (606). In a further example of the disclosure, video encoder 20 may be further configured to signal the plurality of encoded substreams to the video decoder at a constant bitrate.

In another example of the disclosure, video encoder 20 may be further configured to determine that each coding mode within a first set of coding modes of the plurality of coding modes is not useable for encoding the block of video data based on a determination that each coding mode within the first set of coding modes produces a syntax element size greater than the maximum syntax element size for one of the plurality of substream. Video encoder 20 may be further configured to determine that each coding mode within a second set of coding modes of the plurality of coding modes is usable for encoding the block of video data based on a determination that each coding mode within the second set of coding modes produces a syntax element size less than or equal to the maximum syntax element size for all of the plurality of substream. Video encoder 20 may be further configured to determine the coding mode for encoding the block of video data from among the second set of coding modes. In another example of the disclosure, video encoder 20 may be preconfigured with a maximum syntax element size.

In another example of the disclosure, to encode the block of video data in a plurality of substreams according to the determined coding mode to create a plurality of encoded substreams of video data, video encoder 20 may be further configured to encode header information in a first substream of the plurality of substreams based on the determined coding mode, the header information indicative of at least one of the determined coding mode or flatness of the block. Video encoder 20 may be further configured to encode a luminance color component of samples of the block of video data in a second substream of the plurality of substreams, encode a first chrominance component of the samples of the block of video data in a third substream of the plurality of substreams, and encode a second chrominance component of the samples of the block of video data in a fourth substream of the plurality of substreams.

In another example of the disclosure, video encoder 20 may be further configured to encode coding mode information in the first substream based on the determined coding mode, the coding mode information comprising at least one of a table, at least one block prediction vector, or at least one index for the coding mode.

In another example of the disclosure, video encoder 20 may be further configured to distribute entropy coding groups associated with the luminance color component among the first substream, the second substream, the third substream, and the fourth substream. In another example of the disclosure, video encoder 20 may be further configured to distribute entropy coding groups associated with one of the first chrominance component or the second chrominance component among the first substream, the second substream, the third substream, and the fourth substream.

In another example of the disclosure, video encoder 20 may be further configured to pad a respective balance FIFO buffer to prevent underflow of the respective balance FIFO buffer based on a demultiplexer model of the video decoder. In another example of the disclosure, video encoder 20 may be further configured to pad one or more of the plurality of encoded substreams of video data to prevent underflow of a rate buffer.

It should be noted that aspects of this disclosure have been described from the perspective of an encoder, such as the video encoder 20 in FIG. 2A. However, those skilled in the art will appreciate that the reverse operations to those described above may be applied to decode the generated bitstream by, for example, the video decoder 30 in FIG. 2B.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM), synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CO-DEC). Also, the techniques could be fully implemented in one or more circuits or logic elements.

The techniques of this disclosure may be implemented in a wide variety of devices or apparatuses, including a wireless handset, an IC or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

As used herein, instances of the term "content" may refer to the term "video" or "image" and vice versa. This is true regardless of whether the terms "content" or "video" are being used as an adjective, noun, or other part of speech. For example, reference to a "content coder" may include reference to a "video coder" or an "image coder," and reference to a "video coder" or an "image coder" may include reference to a "content coder." Similarly, reference to "content" also includes reference to "video" or "image," and reference to "video" or "image" may include reference to "content."

As used herein, "content" refers to any type of content. For example, "content" may refer to video content, screen content, image content, any graphical content, or any displayable content. As another example, "content" may refer to pixel data corresponding to video content, screen content, image content, any graphical content, or any displayable content. For example, an image includes a plurality of pixels, with each pixel having one or more components depending on the color space. It is therefore understood that reference to "pixel data" may include reference to pixel data of any content.

As used herein, "pixel data" may refer to one or more pixels. The one or more pixels may include one or more component values. For example, a pixel in the RGB color space may include three color components: a red color component value, a green color component value, and a blue color component value. In some examples, a "sample" may refer to a "pixel." In other examples, a "sample" may refer to a component of a pixel. For example, a pixel in the RGB color space may include three samples: a red sample, a green sample, and a blue sample. The red sample may be the red color component value, the green sample may be the green color component value, and the blue sample may be the blue color component value for the pixel. It is thus understood that reference to performing an operation on a sample may refer to performing an operation on a component (e.g., color component) of a pixel.

As used herein, the term "video" may refer to a plurality of images that may be presented in a sequence. As used herein, the term "image" may refer to a single image (e.g., a picture), one or more images, one or more images amongst a plurality of images corresponding to a video, one or more images amongst a plurality of images not corresponding to a video, a plurality of images corresponding to a video (e.g., all of the images corresponding to the video or less than all of the images corresponding to the video), a sub-part (e.g., a sub-block) of a single image, a plurality of sub-parts (e.g., sub-blocks) of a single image, a plurality of sub-parts (e.g., sub-blocks) corresponding to a plurality of images, image data, graphical data, or the like. In some examples, the term "picture" may be interchangeable with "image."

As used herein, the terms "encode" and "compress" may be used interchangeably. Similarly, the terms "decode" and "decompress" may be used interchangeably.

As used herein, the terms "link" or "display link" may refer to a wired or wireless link. In some examples, the terms "link" and "display link" may be interchangeable. In other examples, the terms "link" and "display link" may not be interchangeable. In some examples, a display link may refer to a link over which content must comply with a display protocol (which may also be referred to as a display link protocol). Some examples of display protocols include HDMI protocol, DisplayPort protocol, MIPI DSI protocol, or another communication protocol.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

Various examples have been described. These and other examples are within the scope of the following claims.

What is claimed is:

1. A method for encoding video data, the method comprising:
    determining that each coding mode within a first set of coding modes of a plurality of coding modes is not useable for encoding a block of video data based on a determination that each coding mode within the first set of coding modes produces a syntax element size greater than a maximum syntax element size for one of a plurality of substreams, wherein the maximum syntax element size refers to a maximum possible size of a single component worth of compressed data for the block of video data;
    determining that each coding mode within a second set of coding modes of the plurality of coding modes is usable for encoding the block of video data based on a determination that each coding mode within the second set of coding modes produces a syntax element size less than or equal to the maximum syntax element size for all of the plurality of substreams;
    determining a coding mode for encoding a block of video data from among the second set of coding modes;
    encoding the block of video data in the plurality of substreams according to the determined coding mode to create a plurality of encoded substreams of video data, wherein encoding the block of video data in the plurality of substreams according to the determined coding mode to create the plurality of encoded substreams of video data comprises:
        encoding header information in a first substream of the plurality of substreams based on the determined coding mode, the header information indicative of at least one of the determined coding mode or flatness of the block;
        encoding a luminance color component of samples of the block of video data in a second substream of the plurality of substreams;
        encoding a first chrominance component of the samples of the block of video data in a third substream of the plurality of substreams; and
        encoding a second chrominance component of the samples of the block of video data in a fourth substream of the plurality of substreams;
    storing the plurality of encoded substreams of video data in respective balance first-in, first-out (FIFO) buffers; and
    multiplexing the plurality of encoded substreams in a bitstream for transmitting to a video decoder.

2. The method of claim 1, further comprising:
preconfiguring the maximum syntax element size.

3. The method of claim 1, further comprising:
signaling the plurality of encoded substreams to the video decoder at a constant bitrate.

4. The method of claim 1, further comprising:
encoding coding mode information, for BP mode, in the first substream based on the determined coding mode, the coding mode information comprising at least one of a table, at least one block prediction vector, or at least one index for the coding mode.

5. The method of claim 1, further comprising:
distributing entropy coding groups associated with the luminance color component among the first substream, the second substream, the third substream, and the fourth substream.

6. The method of claim 1, further comprising:
distributing entropy coding groups associated with one of the first chrominance component or the second chrominance component among the first substream, the second substream, the third substream, and the fourth substream.

7. The method of claim 1, further comprising:
padding a respective balance FIFO buffer to prevent underflow of the respective balance FIFO buffer based on a demultiplexer model of the video decoder.

8. The method of claim 1, further comprising:
padding one or more of the plurality of encoded substreams of video data to prevent underflow of a rate buffer.

9. An apparatus configured to encode video data, the apparatus comprising:
    a memory configured to store a block of video data; and
    one or more processors in communication with the memory, the one or more processors configured to:
        determine that each coding mode within a first set of coding modes of a plurality of coding modes is not useable for encoding a block of video data based on a determination that each coding mode within the first set of coding modes produces a syntax element size greater than a maximum syntax element size for one of a plurality of substreams, wherein the maximum syntax element size refers to a maximum possible size of a single component worth of compressed data for the block of video data;

determine that each coding mode within a second set of coding modes of the plurality of coding modes is usable for encoding the block of video data based on a determination that each coding mode within the second set of coding modes produces a syntax element size less than or equal to the maximum syntax element size for all of the plurality of substreams;

determine a coding mode for encoding the block of video data from among the second set of coding modes;

encode the block of video data in the plurality of substreams according to the determined coding mode to create a plurality of encoded substreams of video data, wherein to encode the block of video data in the plurality of substreams according to the determined coding mode to create the plurality of encoded substreams of video data, the one or more processors are further configured to:

encode header information in a first substream of the plurality of substreams based on the determined coding mode, the header information indicative of at least one of the determined coding mode or flatness of the block;

encode a luminance color component of samples of the block of video data in a second substream of the plurality of substreams;

encode a first chrominance component of the samples of the block of video data in a third substream of the plurality of substreams; and encode a second chrominance component of the samples of the block of video data in a fourth substream of the plurality of substreams;

store the plurality of encoded substreams of video data in respective balance first-in, first-out (FIFO) buffers; and multiplex the plurality of encoded substreams in a bitstream for transmitting to a video decoder.

10. The apparatus of claim 9, wherein the one or more processors are preconfigured with the maximum syntax element size.

11. The apparatus of claim 9, wherein the one or more processors are further configured to:
signal the plurality of encoded substreams to the video decoder at a constant bitrate.

12. The apparatus of claim 9, wherein the one or more processors are further configured to:
encode coding mode information, for BP mode, in the first substream based on the determined coding mode, the coding mode information comprising at least one of a table, at least one block prediction vector, or at least one index for the coding mode.

13. The apparatus of claim 9, wherein the one or more processors are further configured to:
distribute entropy coding groups associated with the luminance color component among the first substream, the second substream, the third substream, and the fourth substream.

14. The apparatus of claim 9, wherein the one or more processors are further configured to:
distribute entropy coding groups associated with one of the first chrominance component or the second chrominance component among the first substream, the second substream, the third substream, and the fourth substream.

15. The apparatus of claim 9, wherein the one or more processors are further configured to:
pad a respective balance FIFO buffer to prevent underflow of the respective balance FIFO buffer based on a demultiplexer model of the video decoder.

16. The apparatus of claim 9, wherein the one or more processors are further configured to:
pad one or more of the plurality of encoded substreams of video data to prevent underflow of a rate buffer.

17. An apparatus configured to encode video data, the apparatus comprising:

means for determining that each coding mode within a first set of coding modes of a plurality of coding modes is not useable for encoding a block of video data based on a determination that each coding mode within the first set of coding modes produces a syntax element size greater than a maximum syntax element size for one of a plurality of substreams, wherein the maximum syntax element size refers to a maximum possible size of a single component worth of compressed data for the block of video data;

means for determining that each coding mode within a second set of coding modes of the plurality of coding modes is usable for encoding the block of video data based on a determination that each coding mode within the second set of coding modes produces a syntax element size less than or equal to the maximum syntax element size for all of the plurality of substreams;

means for determining a coding mode for encoding a block of video data from among the second set of coding modes;

means for encoding the block of video data in the plurality of substreams according to the determined coding mode to create a plurality of encoded substreams of video data, wherein the means for encoding the block of video data in the plurality of substreams according to the determined coding mode to create the plurality of encoded substreams of video data comprises:

means for encoding header information in a first substream of the plurality of substreams based on the determined coding mode, the header information indicative of at least one of the determined coding mode or flatness of the block;

means for encoding a luminance color component of samples of the block of video data in a second substream of the plurality of substreams;

means for encoding a first chrominance component of the samples of the block of video data in a third substream of the plurality of substreams; and means for encoding a second chrominance component of the samples of the block of video data in a fourth substream of the plurality of substreams;

means for storing the plurality of encoded substreams of video data in respective balance first-in, first-out (FIFO) buffers; and means for multiplexing the plurality of encoded substreams in a bitstream for transmitting to a video decoder.

18. The apparatus of claim 17, wherein the apparatus is preconfigured with the maximum syntax element size.

19. The apparatus of claim 17, further comprising:
means for signaling the plurality of encoded substreams to the video decoder at a constant bitrate.

20. The apparatus of claim 17, further comprising:
means for encoding coding mode information, for BP mode, in the first substream based on the determined coding mode, the coding mode information comprising at least one of a table, at least one block prediction vector, or at least one index for the coding mode.

21. The apparatus of claim 17, further comprising:
means for distributing entropy coding groups associated with the luminance color component among the first substream, the second substream, the third substream, and the fourth substream.

22. The apparatus of claim 17, further comprising:
means for distributing entropy coding groups associated with one of the first chrominance component or the second chrominance component among the first substream, the second substream, the third substream, and the fourth substream.

23. The apparatus of claim 17, further comprising:
means for padding a respective balance FIFO buffer to prevent underflow of the respective balance FIFO buffer based on a demultiplexer model of the video decoder.

24. The apparatus of claim 17, further comprising:
means for padding one or more of the plurality of encoded substreams of video data to prevent underflow of a rate buffer.

25. A computer-readable storage medium storing instructions that, when executed, cause one or more processors configured to encode video data to:
determine that each coding mode within a first set of coding modes of a plurality of coding modes is not useable for encoding a block of video data based on a determination that each coding mode within the first set of coding modes produces a syntax element size greater than a maximum syntax element size for one of a plurality of substreams, wherein the maximum syntax element size refers to a maximum possible size of a single component worth of compressed data for the block of video data;
determine that each coding mode within a second set of coding modes of the plurality of coding modes is usable for encoding the block of video data based on a determination that each coding mode within the second set of coding modes produces a syntax element size less than or equal to the maximum syntax element size for all of the plurality of substreams;
determine a coding mode for encoding a block of video data from among the second set of coding modes;
encode the block of video data in the plurality of substreams according to the determined coding mode to create a plurality of encoded substreams of video data, wherein to encode the block of video data in the plurality of substreams according to the determined coding mode to create the plurality of encoded substreams of video data, the instructions further cause the one or more processors to:
encode header information in a first substream of the plurality of substreams based on the determined coding mode, the header information indicative of at least one of the determined coding mode or flatness of the block;
encode a luminance color component of samples of the block of video data in a second substream of the plurality of substreams;
encode a first chrominance component of the samples of the block of video data in a third substream of the plurality of substreams; and
encode a second chrominance component of the samples of the block of video data in a fourth substream of the plurality of substreams;
store the plurality of encoded substreams of video data in respective balance first-in, first-out (FIFO) buffers; and
multiplex the plurality of encoded substreams in a bitstream for transmitting to a video decoder.

26. The computer-readable storage medium of claim 25, wherein the one or more processors are preconfigured with the maximum syntax element size.

27. The computer-readable storage medium of claim 25, wherein the instructions further cause the one or more processors to:
signal the plurality of encoded substreams to the video decoder at a constant bitrate.

28. The computer-readable storage medium of claim 25, wherein the instructions further cause the one or more processors to:
encode coding mode information, for BP mode, in the first substream based on the determined coding mode, the coding mode information comprising at least one of a table, at least one block prediction vector, or at least one index for the coding mode.

29. The computer-readable storage medium of claim 25, wherein the instructions further cause the one or more processors to:
distribute entropy coding groups associated with the luminance color component among the first substream, the second substream, the third substream, and the fourth substream.

30. The computer-readable storage medium of claim 25, wherein the instructions further cause the one or more processors to:
distribute entropy coding groups associated with one of the first chrominance component or the second chrominance component among the first substream, the second substream, the third substream, and the fourth substream.

31. The computer-readable storage medium of claim 25, wherein the instructions further cause the one or more processors to:
pad a respective balance FIFO buffer to prevent underflow of the respective balance FIFO buffer based on a demultiplexer model of the video decoder.

32. The computer-readable storage medium of claim 25, wherein the instructions further cause the one or more processors to:
pad one or more of the plurality of encoded substreams of video data to prevent underflow of a rate buffer.

* * * * *